US010488597B2

(12) United States Patent
Parikh et al.

(10) Patent No.: US 10,488,597 B2
(45) Date of Patent: Nov. 26, 2019

(54) CONNECTOR FOR CONNECTING TWO BARE OPTICAL FIBERS

(71) Applicant: Corning Research & Development Corporation, Corning, NY (US)

(72) Inventors: Rutesh D. Parikh, Austin, TX (US); James B. Carpenter, Austin, TX (US); Dennis G. Brannan, Harlingen, TX (US)

(73) Assignee: Corning Research & Development Corporation, Charlotte, NC (US)

(*) Notice: Subject to any disclaimer, the term of this patent is extended or adjusted under 35 U.S.C. 154(b) by 0 days.

(21) Appl. No.: 15/762,247

(22) PCT Filed: Oct. 4, 2016

(86) PCT No.: PCT/IB2016/055932
§ 371 (c)(1),
(2) Date: Mar. 22, 2018

(87) PCT Pub. No.: WO2017/064588
PCT Pub. Date: Apr. 20, 2017

(65) Prior Publication Data
US 2018/0275351 A1 Sep. 27, 2018

Related U.S. Application Data

(60) Provisional application No. 62/240,048, filed on Oct. 12, 2015.

(51) Int. Cl.
*G02B 6/38* (2006.01)
(52) U.S. Cl.
CPC ........ *G02B 6/3809* (2013.01); *G02B 6/3887* (2013.01)

(58) Field of Classification Search
CPC ....... G02B 6/38; G02B 6/3809; G02B 6/3887
See application file for complete search history.

(56) References Cited

U.S. PATENT DOCUMENTS 4,354,731 A 10/1982 Mouissie
4,824,197 A 4/1989 Patterson
(Continued)

FOREIGN PATENT DOCUMENTS

WO WO 2006-036438 4/2006
WO WO 2006-036676 4/2006
(Continued)

OTHER PUBLICATIONS

International Search Report for PCT International Application No. PCT/IB2016/055932, dated Dec. 12, 2016, 3 pages.
(Continued)

*Primary Examiner* — Andrew Jordan
(74) *Attorney, Agent, or Firm* — Grant A. Gildehaus

(57) ABSTRACT

Optical fiber connecting devices and methods of connecting first and second optical fibers are described. The exemplary devices have a housing composed of an upper and lower housing portions, a mechanical element disposed in a cavity of the lower housing portion, the mechanical element configured to axially align and connect the bare glass portions of the first and second optical fibers; and an actuation mechanism to open and close the splice element a plurality of times, and allows the first and second optical fibers to be positioned, secured and actuated in the mechanical element at the same or different times.

19 Claims, 30 Drawing Sheets

(56) References Cited

U.S. PATENT DOCUMENTS

| | | | |
|---|---|---|---|
| 5,005,942 A | 4/1991 | Barlow et al. | |
| 5,102,212 A | 4/1992 | Patterson | |
| 5,138,681 A | 8/1992 | Larson et al. | |
| 5,155,787 A | 10/1992 | Carpenter et al. | |
| 5,159,653 A | 10/1992 | Carpenter et al. | |
| 5,241,613 A | 8/1993 | Li et al. | |
| 5,732,174 A | 3/1998 | Carpenter et al. | |
| 5,734,770 A | 3/1998 | Carpenter et al. | |
| 5,812,718 A | 9/1998 | Carpenter et al. | |
| 5,857,045 A | 1/1999 | Lee | |
| 6,022,150 A * | 2/2000 | Erdman | G02B 6/3843 385/62 |
| 6,951,425 B2 | 10/2005 | Vergeest | |
| 7,333,709 B2 | 2/2008 | Carpenter et al. | |
| 7,369,738 B2 * | 5/2008 | Larson | G02B 6/3801 385/134 |
| 7,454,117 B2 | 11/2008 | Carpenter et al. | |
| 7,556,438 B2 * | 7/2009 | Oike | G02B 6/3806 385/60 |
| 7,558,459 B2 | 7/2009 | Carpenter et al. | |
| 7,637,673 B2 * | 12/2009 | Oike | G02B 6/3846 385/137 |
| 7,787,739 B2 * | 8/2010 | Munn | G02B 6/3809 356/73.1 |
| 7,811,006 B2 * | 10/2010 | Milette | G02B 6/3846 385/136 |
| 8,295,669 B2 | 10/2012 | Park et al. | |
| 8,376,631 B2 * | 2/2013 | Milette | G02B 6/3846 385/81 |
| 8,801,298 B2 * | 8/2014 | Milette | G02B 6/3846 385/76 |
| 2005/0063645 A1 * | 3/2005 | Carpenter | G02B 6/3636 385/70 |
| 2005/0063662 A1 * | 3/2005 | Carpenter | G02B 6/3636 385/136 |
| 2006/0233500 A1 | 10/2006 | Yamauchi et al. | |
| 2007/0104425 A1 * | 5/2007 | Larson | G02B 6/3801 385/86 |
| 2007/0297746 A1 * | 12/2007 | Carpenter | G02B 6/3806 385/137 |
| 2008/0247710 A1 | 10/2008 | Oike et al. | |
| 2009/0060418 A1 | 3/2009 | Munn | |
| 2009/0310918 A1 | 12/2009 | Milette et al. | |
| 2010/0086258 A1 | 4/2010 | Ohtsuka et al. | |
| 2010/0166371 A1 | 7/2010 | Miguel Giraldo et al. | |
| 2011/0052131 A1 | 3/2011 | Park et al. | |
| 2015/0063758 A1 * | 3/2015 | McPhil Giraud | G02B 6/3834 385/78 |
| 2018/0275351 A1 * | 9/2018 | Parikh | G02B 6/3887 |

FOREIGN PATENT DOCUMENTS

| | | | |
|---|---|---|---|
| WO | WO 2008-118927 | 10/2008 | |
| WO | WO 2015-031470 | 3/2015 | |
| WO | WO 2017-063106 | 4/2017 | |
| WO | WO 2017-063107 | 4/2017 | |
| WO | WO-2017064588 A1 * | 4/2017 | G02B 6/3809 |

OTHER PUBLICATIONS

European Patent Application No. 16855026.7 Office Action dated Apr. 25, 2019; 12 Pages; European Patent Office.

* cited by examiner

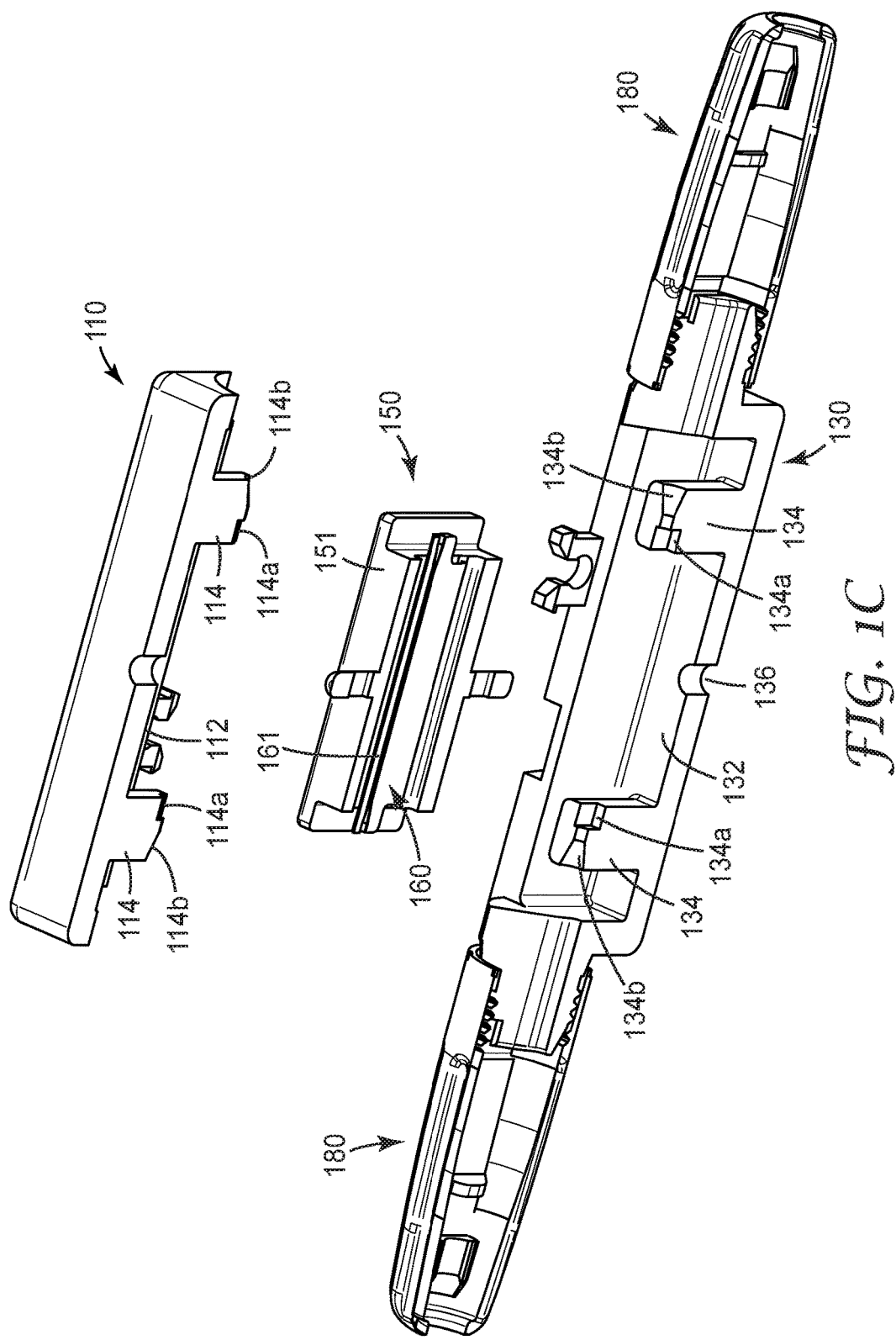

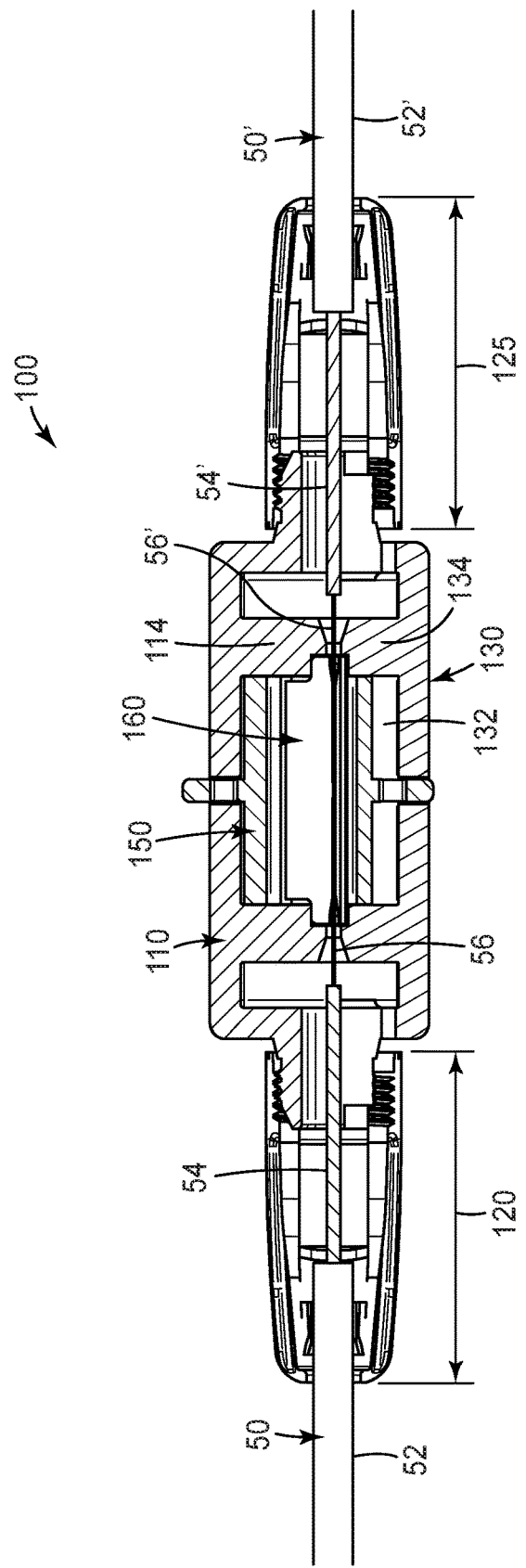

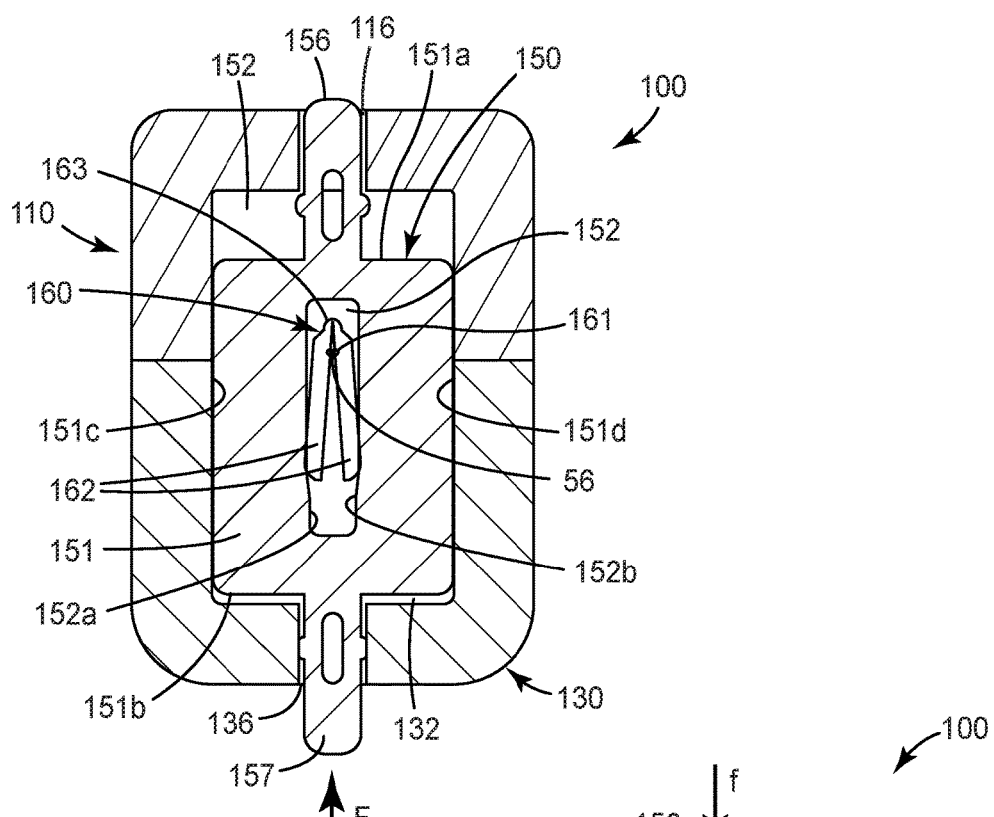
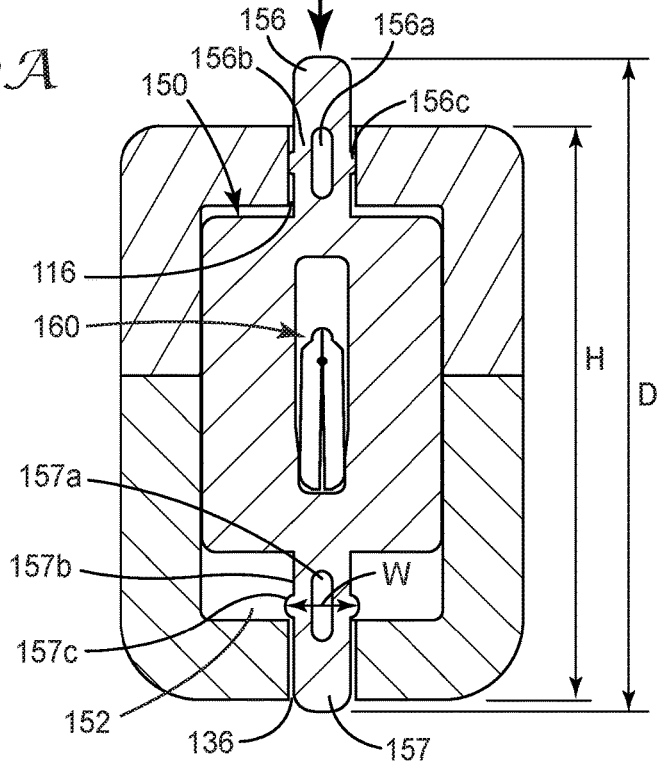

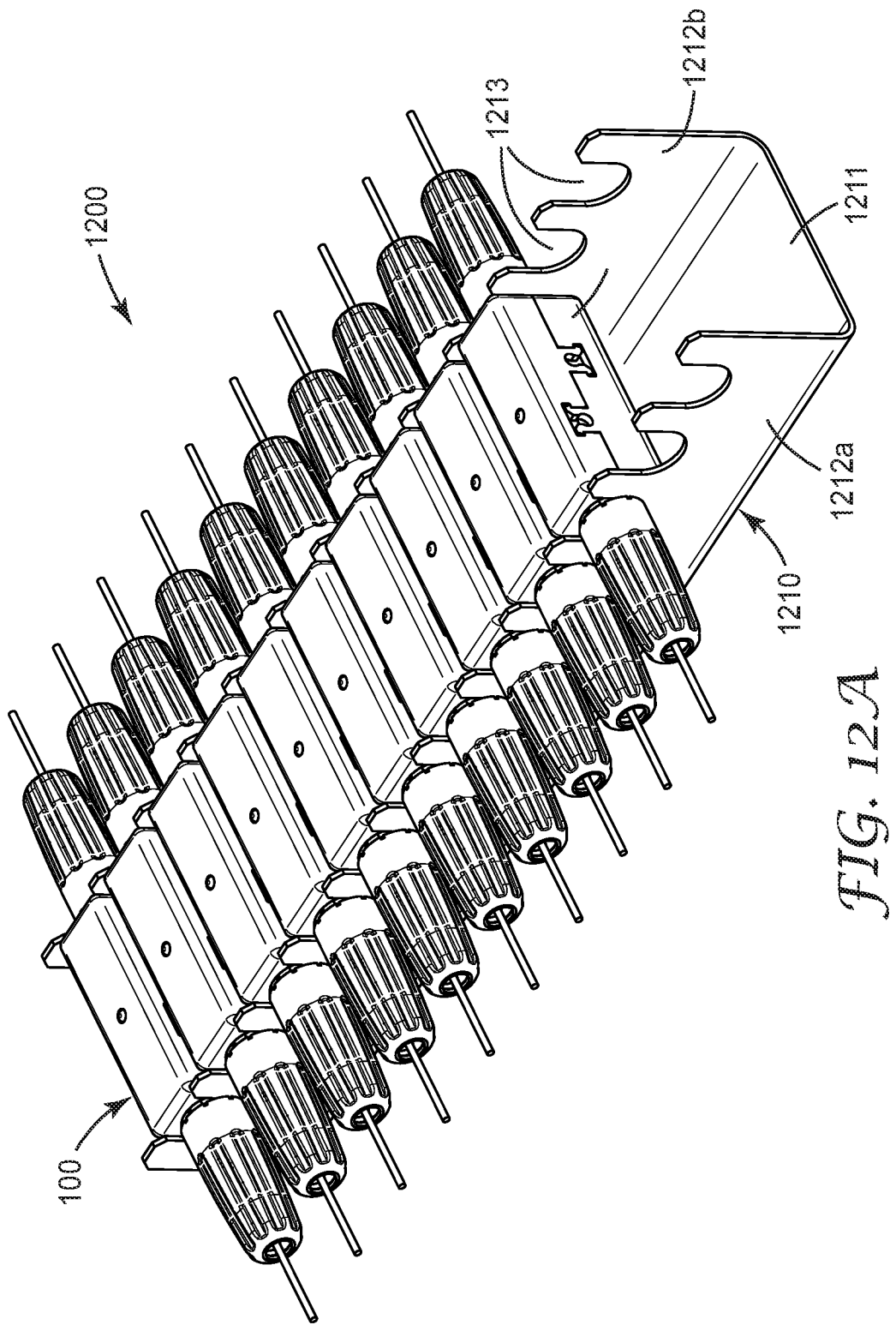

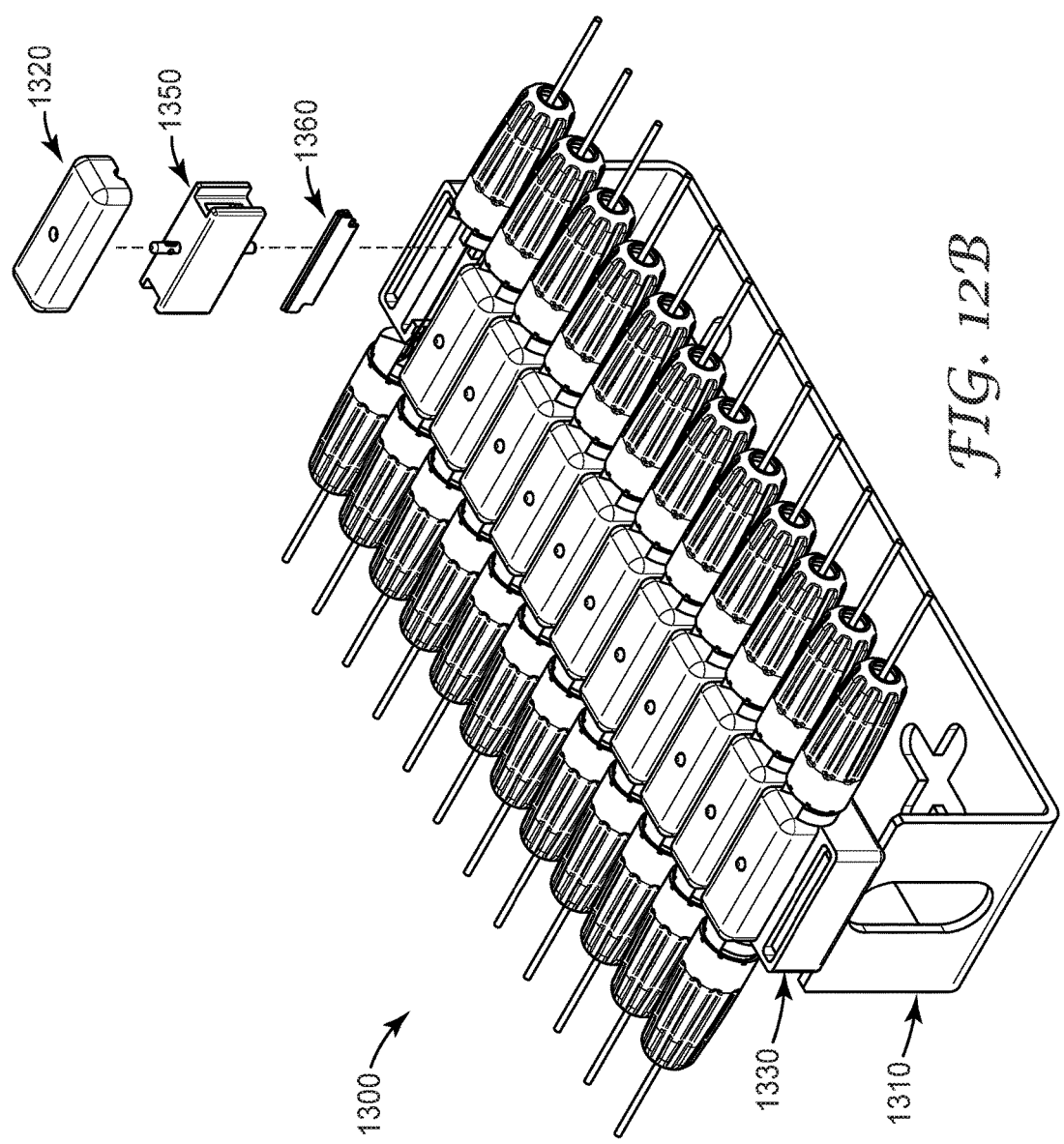

CONNECTOR FOR CONNECTING TWO BARE OPTICAL FIBERS

CROSS-REFERENCE TO RELATED APPLICATIONS

This application is a 35 U.S.C. § 371 filing of International Application No. PCT/IB2016/055932, filed on Oct. 4, 2016, and claims the benefit of priority under 35 U.S.C. § 119 of U.S. Provisional Patent Application No. 62/240,048, filed on Oct. 12, 2015, wherein the contents of the foregoing applications are hereby incorporated by reference herein in their entireties.

FIELD

The present description relates to a fiber optic connector for connecting two bare optical fibers and to a method of connecting two bare optical fibers.

BACKGROUND

With the increasing use of mobile devices, the demand for high speed access to voice, video and data is rapidly growing, driving the need for more, higher speed optical communication lines and higher density connections between the optical communications network. Network providers will frequently install new optical communications parallel to existing copper communication lines to help handle the added bandwidth that customers are demanding. In order to streamline costs and maximize efficiency of the network infrastructure, the network providers will often retrofit the existing copper infrastructure to accommodate the new optical communication lines. This can be especially challenging in roadside cross connect cabinets which have a finite volume. Another issue facing network providers is the higher degree of skill and new installation tooling required for the field technician to join optical communication lines.

Additional issues can arise at data centers which serve as the nexus between the copper and optical communication networks. Large data centers may typically need to manage several thousand or tens of thousands of single fiber connections at the patch panel level on a single rack. The space and simplicity of use of these single fiber connections are the key needs in high count fiber data centers. Currently, many data center customers are using traditional fusion splicing or factory made fiber termination solutions.

Conventional single fiber terminations commonly employed in data centers utilize two male connectors (e.g., SC or LC format optical fiber connectors), and a corresponding adapter, to interconnect a pair of optical fibers. Standard epoxy and ferrule based optical fiber connectors require several precision components (e.g., springs, ferrules, housings, shrouds, and the like) that may result in a higher cost termination solution because these connectors can require more tools, skill and time to install in the field. Additionally, epoxy connectors are more suitable for factory termination.

On the front side of a data center rack, patch cords are used to interconnect a pair of ports. Factory assembled patch cords are assembled in discrete lengths with a male optical fiber connector disposed on each end. Because the patch cords are pre-assembled, the patch cord length may be much longer than what is necessary for a given patching connection, potentially resulting in large amounts of excess cable that need to be managed and stored.

On the back side of a data center rack, multi-fiber input cables have to be spliced to connectorized pigtails. The need to accommodate splicing capacity on the rack requires the use of valuable real estate and reduces the patching capacity of the rack.

More recently, field terminated optical connectors having a factory prepared and installed fiber stub and a mechanical splice element have simplified installation procedures so that connectors are easier to use in the field. However, using a conventional field mountable connection termination solution still requires two optical connectors and an adapter and one may desire to have a solution with fewer necessary components.

Thus, there is a need for a high density field connection system that has a minimal number of parts and that enables simplified installation and assembly.

SUMMARY

In a first embodiment, the present description relates to an optical fiber connecting device for housing a mechanical element for aligning, gripping, and connecting first and second optical fibers. Each optical fiber includes a bare glass portion surrounded by a buffer layer. The device includes a housing comprising an upper housing portion and a lower housing portion, and an actuation mechanism. The lower housing portion is configured to hold a mechanical element disposed in a cavity formed in the lower housing portion. The mechanical element is configured to axially align and connect the bare glass portions of the first and second optical fibers. The actuation mechanism allows for the mechanical element to be opened and closed a plurality of times, and allows for the first and second optical fibers to be positioned, secured and actuated in the mechanical element at the same or different times. In an exemplary aspect, the lower housing portion further includes first and second cable jacket clamping regions formed on the ends of the lower housing portion and disposed on either side of the mechanical element, the first cable jacket clamping region configured to clamp a jacketed portion of the first optical fiber cable containing the first optical fiber and the second cable jacket clamping region configured to clamp a jacketed portion of the second optical fiber cable containing the second optical fiber.

In another embodiment, the present description relates to an optical fiber connecting device module for interconnecting bare glass portions of a plurality of optical fibers. The module comprises a plurality of mechanical elements arranged parallel to one another in a side-by-side arrangement, a plurality of actuation mechanisms to open and close each of the plurality of mechanical elements a plurality of times so that first and second optical fibers can be positioned, secured and actuated in each of the plurality of mechanical elements at the same or different times. Each of the actuation mechanisms is associated with one of the plurality of the mechanical elements, within a module housing comprising at least one upper housing portion and at least one lower housing portion. The plurality of actuation mechanisms and the plurality of mechanical elements are disposed at least partially within the module housing when the at least one the lower housing portion is mated to the at least one upper housing portion.

In a third embodiment, the present description relates to a method of connecting two optical fibers. The method includes providing a first optical fiber having a bare glass portion surrounded by a buffer layer, providing a second optical fiber having a bare glass portion surrounded by a buffer layer, sliding the bare glass portion of the first optical fiber into a first end of a mechanical element until the first cable experiences a certain resistance, sliding the bare glass portion of the second optical fiber into a second end of the mechanical element opposite the first end until the second optical fiber experiences a certain resistance, and locking the bare glass portions of the first and second optical fibers in the mechanical element by activing an actuation mechanism.

In a fourth embodiment, the present description relates to a method of connecting two optical fibers in a factory mounted optical fiber connecting device that is preterminated on a first terminal end of a first optical fiber. The optical fiber connecting device includes a mechanical element having a first end and a second end disposed in a housing and an actuation mechanism to open and close the mechanical element, wherein the first optical fiber is secured in the first end of the mechanical element by moving the actuation element to a closed position. The method includes providing a second optical fiber having an exposed second bare glass portion, opening the mechanical element by moving the actuation element to an opened position, inserting the second bare glass portion of the second optical fiber into a second end of the optical fiber connecting device and into the second end of the mechanical element, and locking the second optical fiber in the second mechanical element by moving the actuation element to a closed position.

BRIEF DESCRIPTION OF THE DRAWINGS

FIGS. 1A-1E are five views of an exemplary optical fiber connecting device according to the present invention.

FIGS. 2A and 2B are two cross-sectional views of the optical fiber connecting device of FIGS. 1A-1E shown in an open state and a closed state

FIGS. 12A-12B are isometric views of another partially assembled optical fiber connecting device module assembly according to the present invention.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
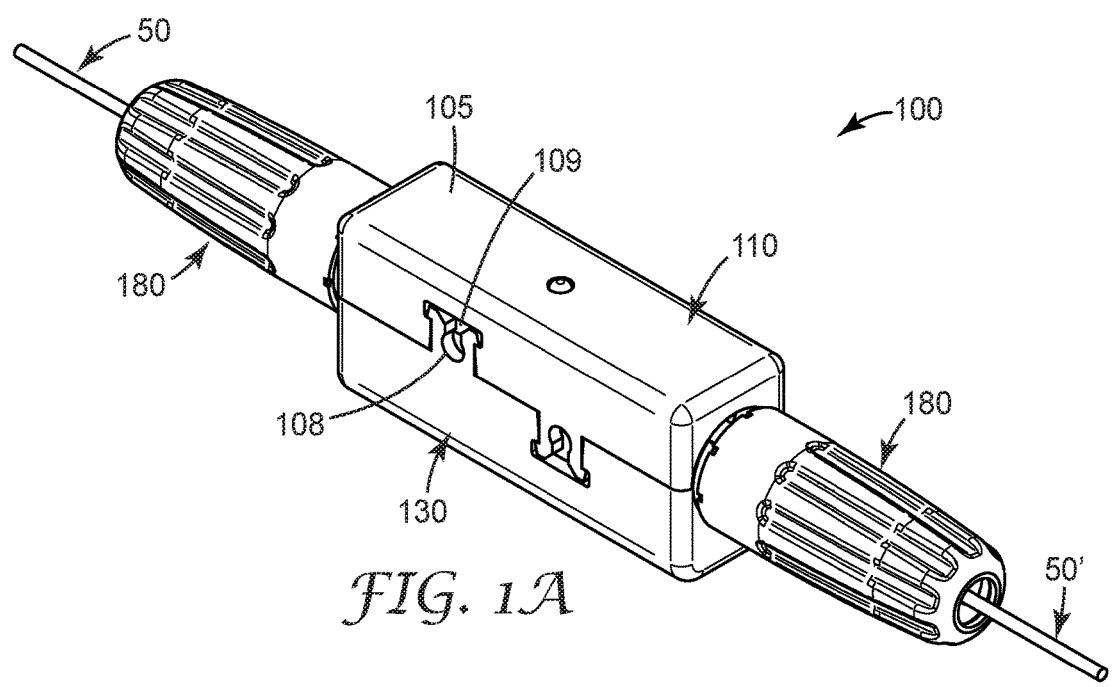

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

The present invention is an optical fiber connecting device that allows the direct reversible connection of two optical fibers in a small form factor device without the need for a conventional optical fiber splice (fusion or mechanical) or a conventional optical fiber connector. In an exemplary aspect, the optical fiber connecting device includes an actuation mechanism that allows for the mechanical element to be opened and closed a plurality of times, and allows for the first and second optical fibers to be positioned, secured and actuated in the mechanical element at the same or different times.

Conventional fusion splicing is commonly used to simultaneously and permanently connect two optical fibers together. Fusion splicing requires operators to have a fusion splice machine that melts the terminal ends of the optical fibers being connected and pushes them together to create a fusion splice. Fusion splices are generally placed inside of a heat shrinkable protective tube to stabilize and protect the optical splice. Conventional mechanical splices are commonly used to simultaneously connect two optical fibers together in a quasi-permanent connection. If the connection made between the two optical fibers is faulty, the mechanical holding means can be reopened (frequently requiring an auxiliary tool), the fibers repositioned, and the mechanical holding means reactivated. Once a good connection is made, conventional mechanical splice devices are permanent.

In contrast, optical fiber connectors allow a reversible optical connection. Each optical fiber is held in an individual connector body. In order to make an optical connection, two optical connectors are connected together via a connector adapter. For example, conventional epoxy optical fiber connectors use several precision components (spring, ferrule, housing, backbone, etc.) and requires specialized adhesive curing equipment which limits the use of these connectors to applications which are compatible factory termination of an optical fiber. In more recent years, mechanical field mountable connectors have become popular. These connectors also use several precision components (spring, ferrule, housing, backbone, etc.) and designed to allow only one time termination of a given optical fiber. In addition, some field mount optical fiber connectors require polishing or finishing of the tip of the fiber in order to provide the necessary optical performance. The trend toward higher density single fiber connection devices is driving demand for smaller and smaller optical interconnection devices.

The optical connection device of the present disclosure seeks to overcome the short comings of conventional technologies to provide a smaller form factor (e.g. shorter) connection device that enables easier and reversible interconnection of two optical fibers.

The exemplary optical fiber connecting devices can be used as a single stand-alone device or a plurality of the exemplary devices can be combined into a module assembly for use in fiber to the home network link, in fiber cabinets or enclosures; optical fiber wall boxes, cabinets, equipment rooms, or enclosures in premises optical networks; high density optical distribution frames in data centers or telecommunication central offices: high density patch panels in mobile switching centers, enclosures for fiber to the antenna installations and in small cell aggregation point and back haul enclosures in wireless networks.

FIGS. 1A-1E show an exemplary optical fiber connecting device 100 for independently securing two optical fibers 50, 50'. Because each fiber is terminated independently, the exemplary optical fiber connecting device can be factory terminated onto one of the optical fibers, saving the installer time, or can be installed onto one of the optical fibers during installation or expansion of an optical fiber network of installation. The optical connection with a second optical fiber can be made at a later time. The exemplary optical fiber devices described herein are configured to connect two optical fibers of the same type (single mode or multimode) simultaneously to make an optical connection. In one aspect, the first optical fiber 50 can be a portion of a first optical fiber cable, and the second optical fiber 50' is a portion of a second optical fiber cable. The first and second optical fiber cables can each have a bare glass portion (i.e. the core of the optical fiber plus the cladding that surrounds the core), at least one buffer layer surrounding the bare glass portion, and a jacket surrounding the buffer layer.

The optical fibers 50, 50' can be can be a conventional optical fiber cable such as a 250 µm or 900 µm buffer coated fiber. Kevlar® reinforced jacketed fiber, a jacketed drop cable or other sheathed and reinforced fiber. The optical fiber of the optical fiber cable can be single mode or multi-mode. Example multi-mode fibers can have a 50 µm core size, a 62.5 µm core size, or a different standard core size. In another alternative aspect, the optical fiber cable can comprise a conventional plastic optical fiber. In yet another aspect, the optical fiber cable can be an FRP drop cable, a 1.6 mm to 6.0 mm jacketed round drop cable, a flat drop cable, or other optical fiber drop cable. In an exemplary aspect, drop cables from a demarcation point can be connected to an indoor/outdoor type of 4.8 mm to 6 mm or approximately 3 mm fiber cable. In the exemplary aspect shown in the figures, optical fibers 50, 50' include a bare glass portion 56, 56' disposed within a buffer coating 54, 54' which is disposed in an outer coating layer 52, 52' (FIG. 1E). The outer coating layer can be another buffer layer, an indoor jacket or a ruggedized outdoor jacket. In some aspects, 250 µm or 900 µm buffer coated fiber can be disposed in a larger diameter buffer tube or a short piece of buffer tubing that provides added strain relief as the optical fiber exits the exemplary optical fiber connecting device.

Optical fiber connecting device 100 includes a main body or housing 105 having an upper housing portion 110 and a lower housing portion 130 that can be secured together by catch features disposed on the upper and lower housing portions. In the one aspect, the catch feature 108 comprises a pair of opposing latch arms 108a (FIG. 1D) having a small hook 108b at their free end that extend from the side wall of the upper/and/or lower housing portions. Catch feature 108 mates with a T-shaped depression 109 formed in the sidewalls of the other of the lower and/or upper housing portions. In the exemplary aspect, two sets of catch features can be disposed on each side of the housing. The catch features are shown in an engaged arrangement in FIGS. 1A and 1n a disengaged arrangement in FIG. 1D.

The upper housing portion 110 and a lower housing portion 130 are configured to contain a mechanical element 160 and an actuation mechanism 150 that is capable of opening and closing the mechanical element a plurality of times which allows the first and second optical fibers to be positioned, secured and actuated in the mechanical element at the same or different times.

Figure 1B:
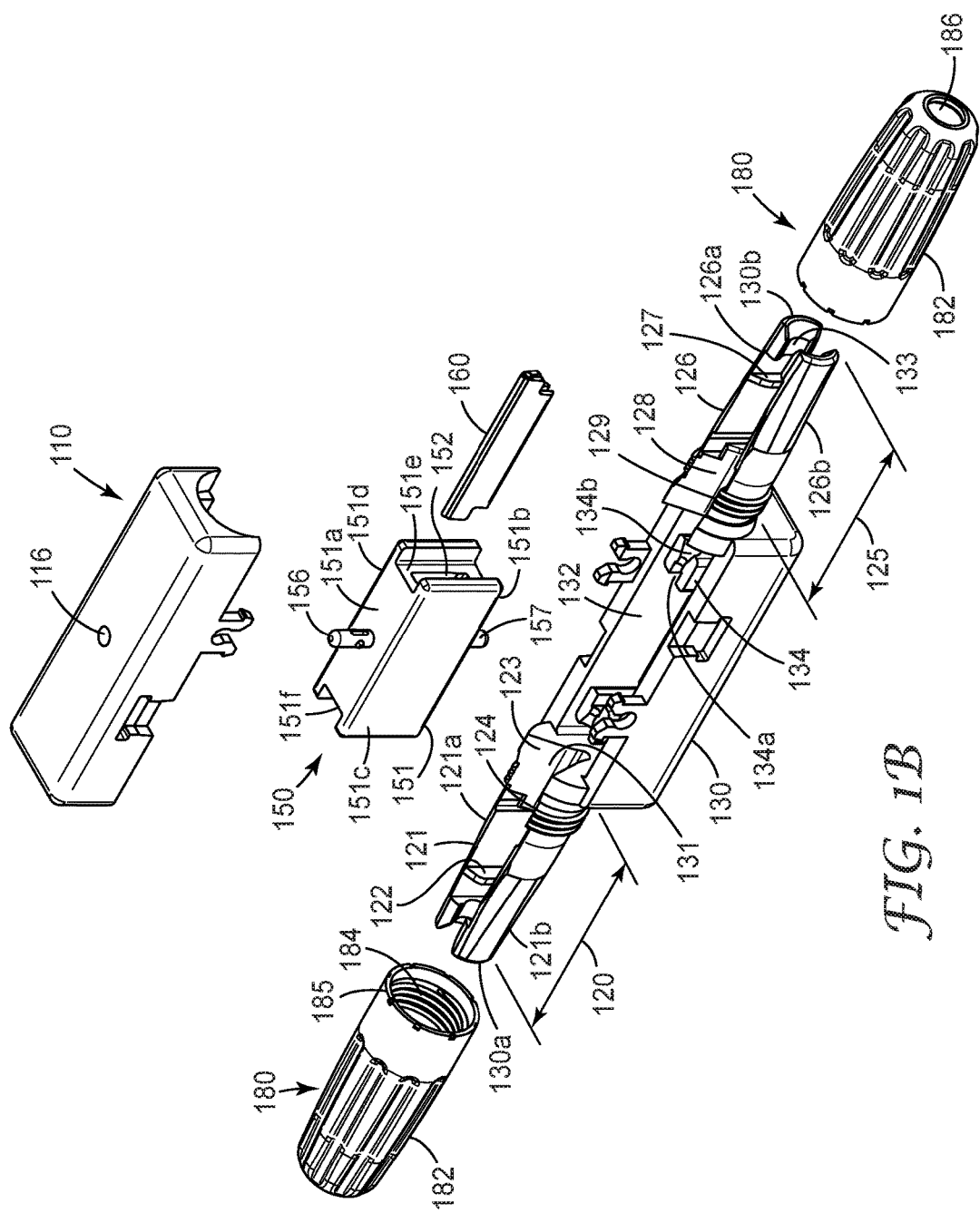
Figure 1D:
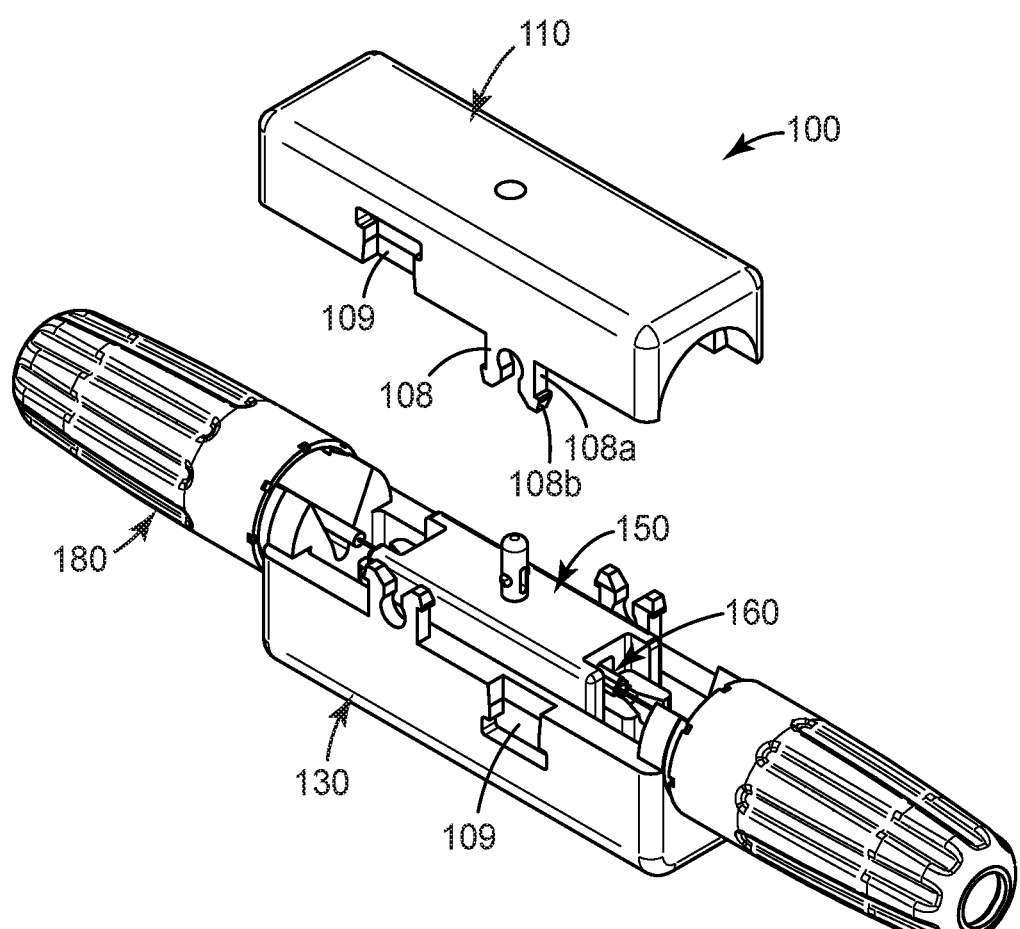

Lower housing portion 130 has a first end 130a and a second end 130b and a channel 131 extending longitudinally through the lower housing portion from a first end to the second end to guide the optical fibers being connected within optical connecting device 100 as shown in FIG. 1B. The lower housing portion includes at least one cavity 132 formed along the channel within the lower housing portion. In the exemplary embodiment shown in FIG. 1B, the lower housing portion includes one cavity formed along the centerline of the channel that is configured to house at least a portion of the actuation mechanism 150. Two pillars 134 are disposed within the cavity and extend from the inside surface of the lower housing portion that together with pillars 114 in the cavity 112 of the upper housing portion 110 position and hold mechanical element within the housing 105, as well as providing optical fiber guiding means on either side of the mechanical element as shown in FIG. 1C in an exploded isometric sectional view and in FIG. 1E in an assembled cross-sectional view. In particular, pillars 114, 134 each have an element holding notch 114a, 134a and a half funnel guide structure 114b. 134b formed in the free end of the pillars.

In an exemplary embodiment, mechanical element 160 can be a folded aluminum element having a stamped or coined alignment groove formed in an interior surface thereof to secure and/or grip at least one optical fiber. For example, commonly owned U.S. Pat. No. 5,159,653, incorporated herein by reference in its entirety, describes an optical fiber splice device (similar to a 3M™ FIBRLOK™ II mechanical fiber optic splice device) that includes a mechanical element that comprises a sheet of ductile material having a focus hinge 163 that couples two legs 162, where each of the legs includes a fiber gripping channel (e.g., a V-type (or similar) groove 161) to optimize clamping forces for conventional glass optical fibers received therein, as shown in FIGS. 2A and 2B. The ductile material, for example, can be aluminum or anodized aluminum. If the mechanical element will be used to join a pair of optical fibers, a conventional index matching fluid can be preloaded into the V-groove region of the mechanical element for improved optical connectivity within the mechanical element. Other conventional mechanical elements can also be utilized in accordance with alternative aspects of the present invention and are described in U.S. Pat. Nos. 4,824,197; 5,102,212; 5,138,681; and 5,155,787, each of which is incorporated by reference herein, in their entirety.

Referring to FIGS. 1B, 2A and 2B, the actuation mechanism 150 is a button-like switch that comprises an actuation sleeve 151 that can be moved within the housing of optical connecting device 100 to open and close mechanical element 160 that is at least partially disposed in a passageway 152 through the actuation sleeve and actuating means for moving the actuation sleeve within the housing of the optical fiber connecting device. In the present aspect, the actuation sleeve can have a shape of a generally rectangular prism having a top wall 151a, a bottom wall 151b, side walls 151c, 151d and end walls, 151e, 151f.

Passageway 152 through the actuation sleeve has a variable width along an axis extending between the top wall 151a and bottom wall 151b. The side walls of the passageway act as cam surfaces 152a, 152b to open and close mechanical element 160. The cam surfaces have a first portion near the bottom wall of the actuation sleeve that are closer to each other than at a second portion of the cam surfaces near the top wall of the actuation sleeve. There is a sloped transition portion between the first and second portions of the cam surface to aid the actuation sleeve in sliding with respect to the mechanical element 160 when actuated. When the actuation sleeve is lifted, the legs 162 of the mechanical element slide along the transition portion. The transition portion pushes the legs of the gripping element towards one another other to a closed position to secure a bare glass portion of an optical fiber 56 passing at least partially through the mechanical element.

The actuation mechanism also includes an actuation element that interacts with or influences the actuation sleeve causing the actuation sleeve to move with respect to the mechanical element. In this first embodiment of an exemplary connecting device 100, the actuation elements is a pair of pegs or buttons 156, 157 that extend from the top and bottom walls 151a, 115b of the actuation sleeve 151. Pegs 156, 157 can have the form of a compliant pin that engage with through holes 116, 136 through the upper and lower housing portions of the connection device. The pegs can each have a compliant section having a central slot 156a, 157a through the pegs between two rails 156b, 157b having a small protrusion on the outside edge of the rails. The compliant section is characterized by a width, W. The width of the compliant section should be greater than the diameter of the holes into which it will be inserted. Thus, at least one of the compliant sections is retained in one of the holes through the upper and lower housing portions by an interference fit between the compressed compliant section of one of the pegs and the side wall of the opening in which it is disposed.

To assemble optical fiber connecting device 100, mechanical element 160 is disposed in the passageway of the actuation sleeve 151 with the focus hinge at the top. The actuation sleeve is placed into the lower housing portion 130 so that the peg 157 is disposed in through hole 136 in the lower housing portion and the ends of the mechanical element are positioned in element holding notches 134a on the top of pillars 134 disposed in the lower housing portion. The upper housing portion 110 is then attached to the lower housing portion being sure to align peg 156 with through hole 116 and the top ends of the mechanical elements with the element holding notch 114a formed in pillars 114 of the upper housing portion. After everything is engaged, the upper housing portion can be snapped to the lower housing portion engaging the catch elements 108, 109.

FIG. 2A is a cross sectional view of optical fiber connecting device 100 showing actuation sleeve 151 in a first position in which the mechanical element 160 is in an open position to allow insertion (or withdrawal) of a bare glass portion of an optical fiber 56 into or out of the mechanical element. Force, F, is applied to the end of peg 157 causing the actuation sleeve to move upwards with respect to the mechanical element which is fixed in position. The legs 162 of the mechanical element slide along cam surfaces 152a, 152b of the passageway 152 pushing the legs of the gripping element towards one another other to a closed position to secure a bare glass portion of an optical fiber 56 in grooves 161 of the mechanical element. This second position of the actuation sleeve is shown in FIG. 2B. To remove one or more of the optical fibers from the mechanical element, a force, f, is applied to the end of peg 156. The actuation sleeve moves down relative to the mechanical element so that the legs of the mechanical element slide along cam surface to the widest portion of the passageway, allowing the legs to spread apart due to the inherent spring force of the mechanical element's hinge 163 that is formed when the mechanical element is created. The spring force opens the mechanical element so that the optical fibers positioned therein can be removed or repositioned. In this way, optical fibers can be readily connected and disconnected with this exemplary connection device. Advantageously, the actuation mechanism described above acts like a pair of buttons that the craftsman can push to actuate and/or de-actuate the mechanical element without the need for separate tools.

The downward facing mechanical element (i.e. having the opening between the legs of the element disposed nearer to the lower housing portion) can aid in reducing the accumulation of dirt/debris in the element's alignment groove. In some embodiments of the invention, an index matching gel (not shown) can be disposed in the mechanical element at the point where the bare glass portions of the first and second optical fibers will ultimately reside upon actuation of the mechanical element.

Lower housing portion 130 can further include first and second cable jacket clamping regions 120, 125 integrally formed at the ends of the lower housing portion and disposed on either side of the mechanical element. Thus, the lower housing portion can be a unitary structure configured to house the mechanical element (with the upper housing portion) as well as providing the basic structure (e.g. the clamping regions) necessary to retain the first and second optical fibers in the optical fiber connecting device. The first cable jacket clamping region 120 is configured to clamp the jacketed portion 52 of the first optical fiber cable 50 (shown in cross section in FIG. 1E) containing the first optical fiber 50 and the second cable jacket clamping region 125 configured to clamp the jacketed portion of the second optical fiber cable containing the second optical fiber 50'. In an alternative embodiment, the first and second cable jacket clamping regions can each be configured to clamp the outer surface of a buffer tube (not shown) containing the first and second optical fibers, respectively.

In an exemplary embodiment, the first and second cable jacket clamping regions 120, 125 can have the same basic structures. For example, each of the first and second cable jacket clamping regions comprises a clamping portion 121, 126 having a collet-type, split body shape comprising two arms 121*a*, 121*b* and 126*a*, 126*b* that extend away from the lower housing portion 130 along a common axis. The clamping portion can include raised inner surfaces (e.g. teeth, barbs or triangular ridges, not shown) near the free end of the arms to permit ready clamping of the cable jacket portion of an optical fiber cable. Each arm can include a stop 122, 127 formed on an inner surface opposite the stop on the other arm. The stops prevent passage of a cable jacket portion of an optical fiber from being inserted further into the optical connection device. In an alternative aspect, the connector can also include an adapter tube to be placed over the cable jacket portion of the optical fiber cable, for example, when the optical fiber cable being clamped is of a smaller diameter. In addition, the clamping portion can also provide a guide structure 123, 128 such as funnel shaped guide structure to facilitate guiding of the bare glass portion of the fiber cable into the housing of the exemplary optical fiber connecting device.

A boot 180 can be utilized to actuate each of the clamping portions 121, 126 when secured to the optical fiber connecting device 100. In an exemplary aspect, each boot can be attached to the clamping portion by a screw-type mechanism. When working with optical fiber cables having strength members, especially Kevlar or glass floss strength members, the boots can be used to clamp the fiber strength members as well as the fiber jackets of the first and second optical fibers to improve the retention strength of the optical fiber cables in the optical fiber connecting device.

In an exemplary aspect, boot 180 includes a tapered body 182 having an axial bore throughout with threaded grooves 184 formed on an inner surface at the front opening 185, wherein the grooves are configured to engage with the correspondingly threaded mounting structure 124, 129 of the clamping portions 121, 126 extending from the lower housing portion 130. In addition, the axial length of boot is configured such that a rear section of the boot, which has a smaller opening 186 than at front opening, engages the jacket clamp portion. For example, when boot 180 is secured onto the threaded mounting structure of the lower housing portion, the axial movement of the boot relative to the lower housing portion forces the arms of clamp portion to move radially inwards so that the fiber jacket is tightly gripped between the arms of the clamping portion. Also, the strength members of the optical fiber cable can be disposed between the boot and the threaded mounting structure to secure the strength members as the boot is installed. This construction can provide a terminated optical fiber connecting device capable of surviving rougher handling and greater pull forces.

In an exemplary aspect, boat 180 is formed from a rigid material. For example, one exemplary material can comprise a fiberglass reinforced polyphenylene sulfide compound.

While the clamping portions are described as having a collet-type, split body shape, those knowledgeable in the art will recognize that other cable clamping structures can also be at least partially formed as an integral structure with the lower housing portion. For example, the lower jaw of an alligator style cable clamp can be integrally formed with the lower housing portion while the top jaw of the alligator style cable clamp is pivotally mounted to the lower jaw by a hinge.

Figure 3A:
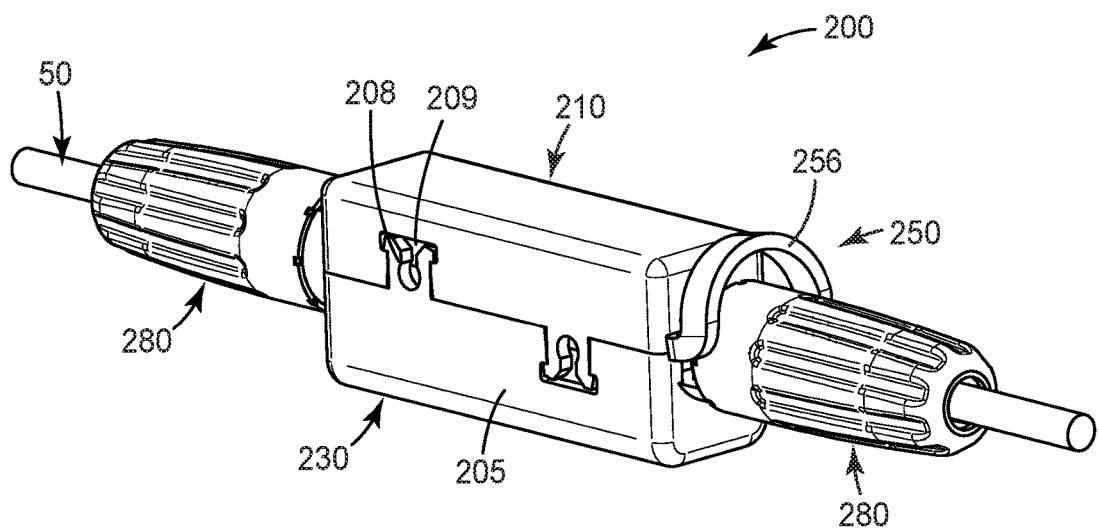
FIGS. 3A-3D are four views of a second exemplary optical fiber connecting device according to the present invention.
Figure 3B:
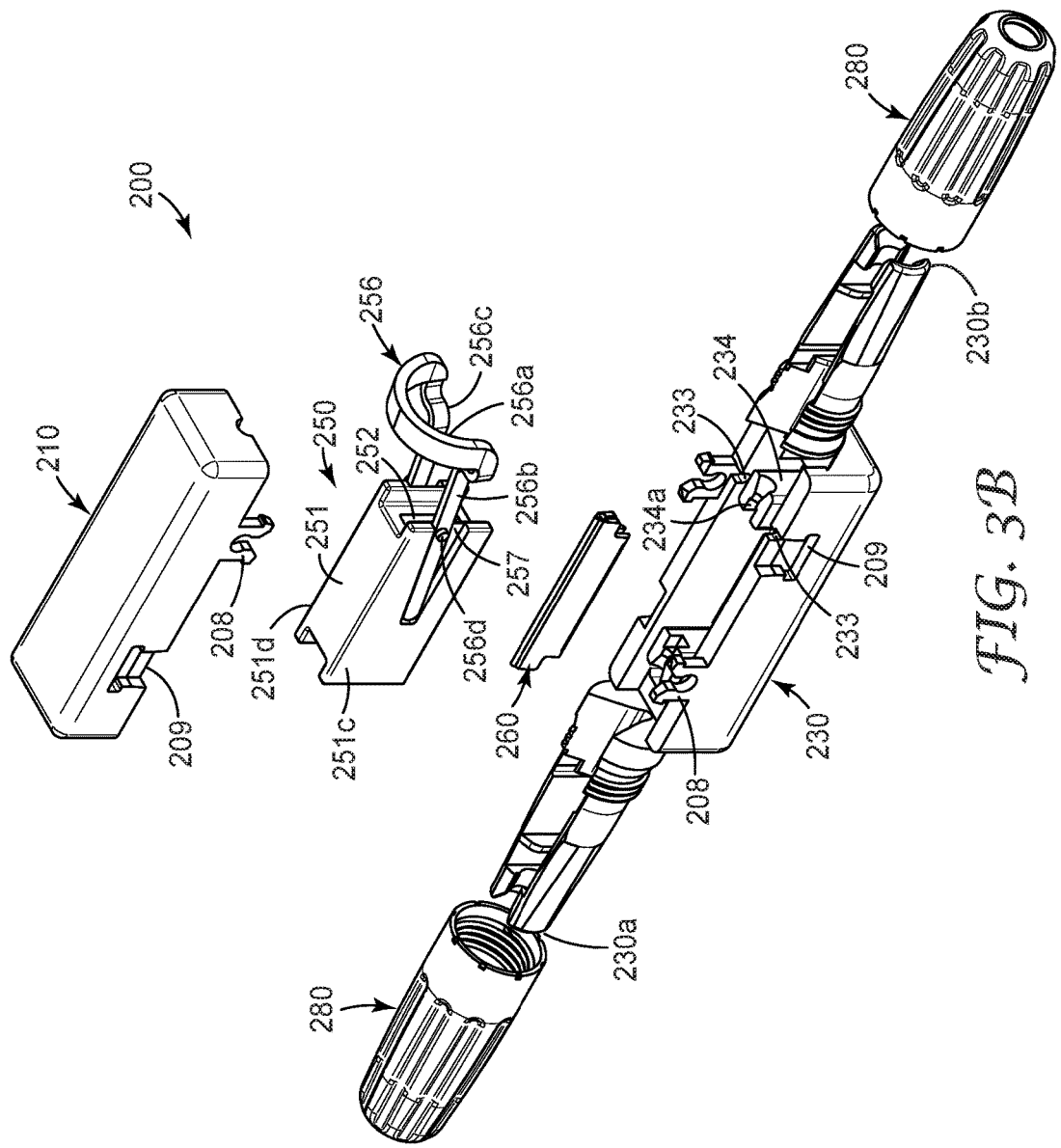
Figure 3C:
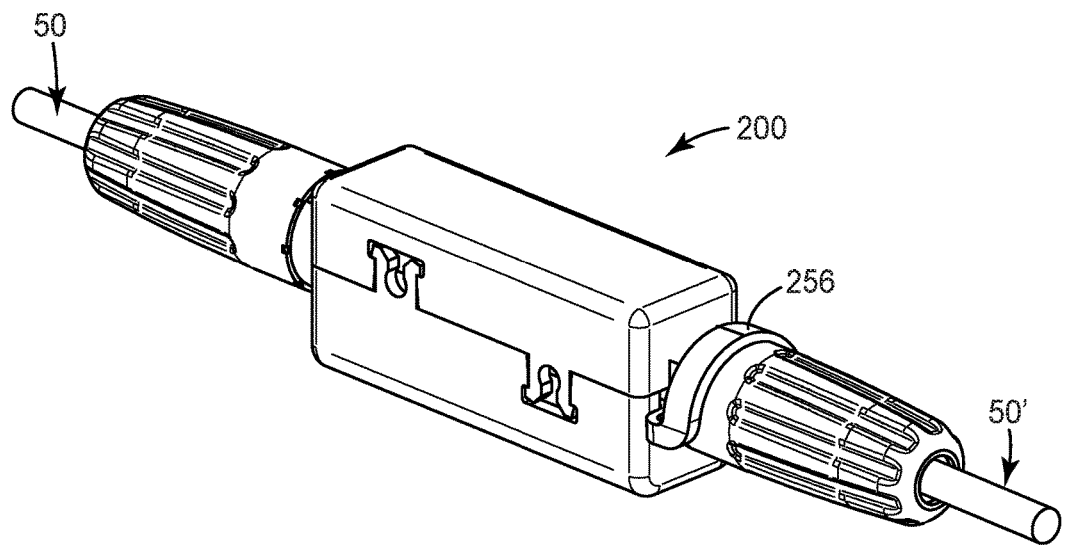

FIGS. 3A-3C show a second exemplary optical fiber connecting device 200 according to the present invention. Exemplary optical fiber connecting device 200 is structurally similar to optical fiber connecting device 100 shown in FIGS. 1A-1E except that optical fiber connecting device 200 utilizes a different actuation mechanism for opening and closing the mechanical element in the device.

Optical fiber connecting device 200 includes a main body or housing 205 having an upper housing portion 210 and a lower housing portion 230 that can be secured together by catch features 208, 209 disposed on the upper and lower housing portions. The upper and lower housing portion are configured to contain a mechanical element 260 and an actuation mechanism 250 that allows for the mechanical element to be opened and closed a plurality of times.

Figure 3D:
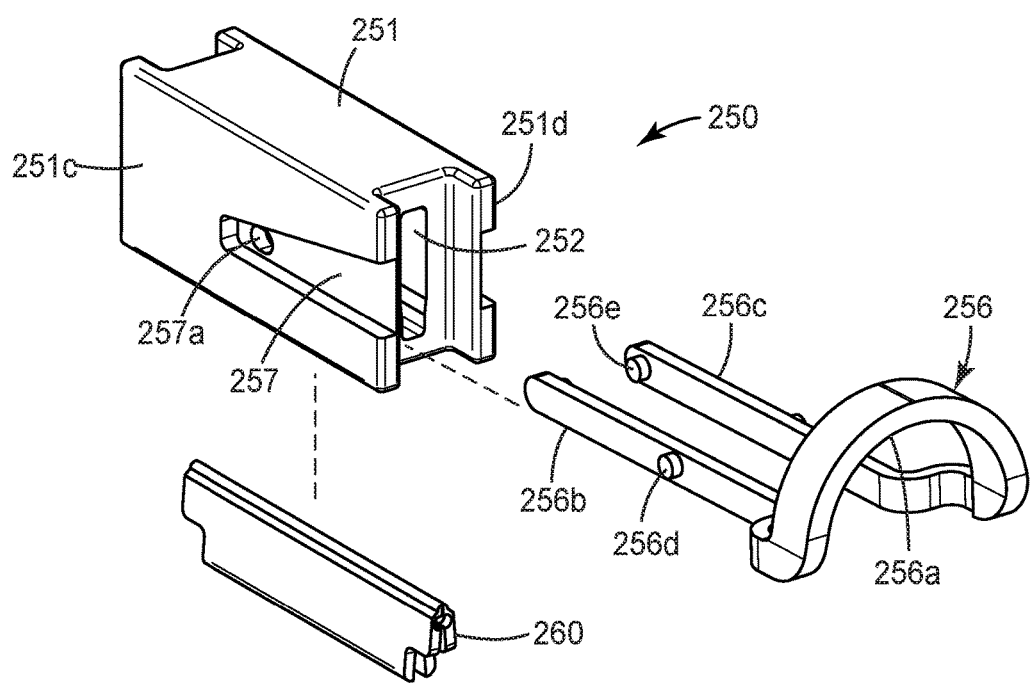

Referring to FIGS. 3B and 3D, the actuation mechanism 250 is a lever-style switch that comprises an actuation sleeve 251 that can be moved by an actuation element to open and close mechanical element 260 that is at least partially disposed in a passageway 252 that extends through the actuation sleeve. The actuation element shown in the embodiment of FIGS. 3A-3D, is an actuation lever 256. The actuation lever comprises a hoop portion 256*a* connected between a pair of shaft members 256*b*, 256*c* at one end of the shaft members, a short cylindrical protrusion 256*d* extending from the outside surface of a middle portion of each shaft member, and a connecting pin 256*e* extending from an inside edge of the shaft members at an end opposite the hoop portion. The connecting pins can be pivotally connected to the actuation sleeve by inserting them into receptacles 257*a* disposed in opposing side walls 251*c*, 251*d* of the actuation sleeve. The shaft member can reside in a pie shaped depression 257 in the side walls of the actuation sleeve when the connecting pins are disposed in the receptacles. In one aspect, the receptacles can be disposed at the apex of the pie shaped depression. The size and shape of the pie-shaped depression controls the range of up and down motion for the actuation sleeve.

Shaft members 256*b*, 256*c* can extend through clearance gaps (not shown) formed in one of the end walls of the lower housing portion 230 so that the actuation hoop portion of the activation lever is accessible when the actuation mechanism is installed inside optical fiber connecting device 200. To assemble the connecting device, mechanical element 260 is disposed in the passageway of the actuation sleeve with the focus hinge at the top. The actuation sleeve is placed into the lower housing portion so that the cylindrical protrusions 256*d* are disposed in receiving slots 233 in the lower housing portion 230 and the ends of the mechanical element are positioned in element holding notch 234*a* on the top of pillars 234. The upper housing portion 210 is then attached to the lower housing portion being sure that the top ends of the mechanical elements are disposed in the element holding notches formed in the pillars housed within the upper housing portion, as described previously. After everything is engaged, the upper housing portion can be snapped to the lower housing portion engaging the catch elements 208, 209 to secure the upper housing portion to the lower housing portion.

The cylindrical protrusions act as the fulcrum for actuation lever 256 when they are disposed in the receiving slots 233. Thus when the hoop portion 256*a* of the actuation lever 256 is raised, the actuation sleeve moves downward with respect to the mechanical element and when the hoop portion 256*a* of the actuation lever 256 is lowered, the actuation sleeve moves upward with respect to the mechanical element.

To terminate the first and or the second optical fibers in optical fiber connecting device 200, the actuation lever 256 is placed in a raised or first position opening the mechanical element. FIG. 3A shows the actuation lever of the assembled optical fiber connecting device in a first or open position. Boot 280 is slipped over a stripped and cleaved optical fiber being terminated which includes an exposed bare glass portion at its end. The bare glass portion of the optical fiber is inserted into the device until a resistance force is felt through the fiber. The actuation lever can be pressed down to close the mechanical element in place as shown in FIG. 3C. The boot is attached over the clamping portion to secure the device to the jacket of the optical fiber. When the second optical fiber needs to be connected, the procedure is repeated. The first and second optical fibers can be terminated in the exemplary connection device at the same or different times.

In an exemplary aspect, the terminal ends of the optical fibers can be cleaved so they have a flat end faces (e.g. the end faces are perpendicular to the longitudinal axis of the optical fibers). Alternatively, the first and second optical fibers can be angle cleaved to improve back reflection performance or can be chamfered to increase core contact area of the fiber to improve the connection loss.

Figure 4A:
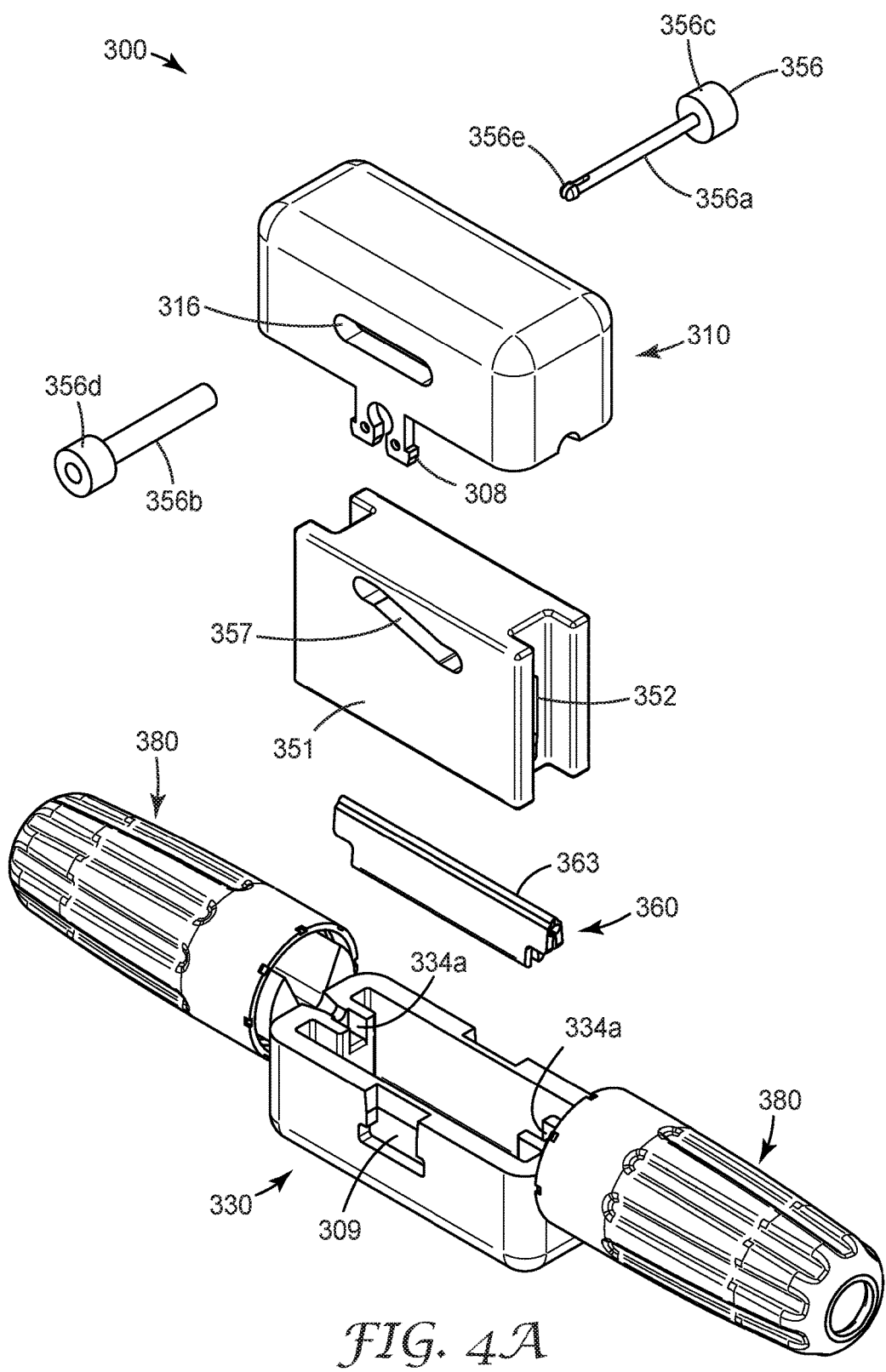
FIGS. 4A-4C are three views of a third exemplary optical fiber connecting device according to the present invention.
Figure 4B:
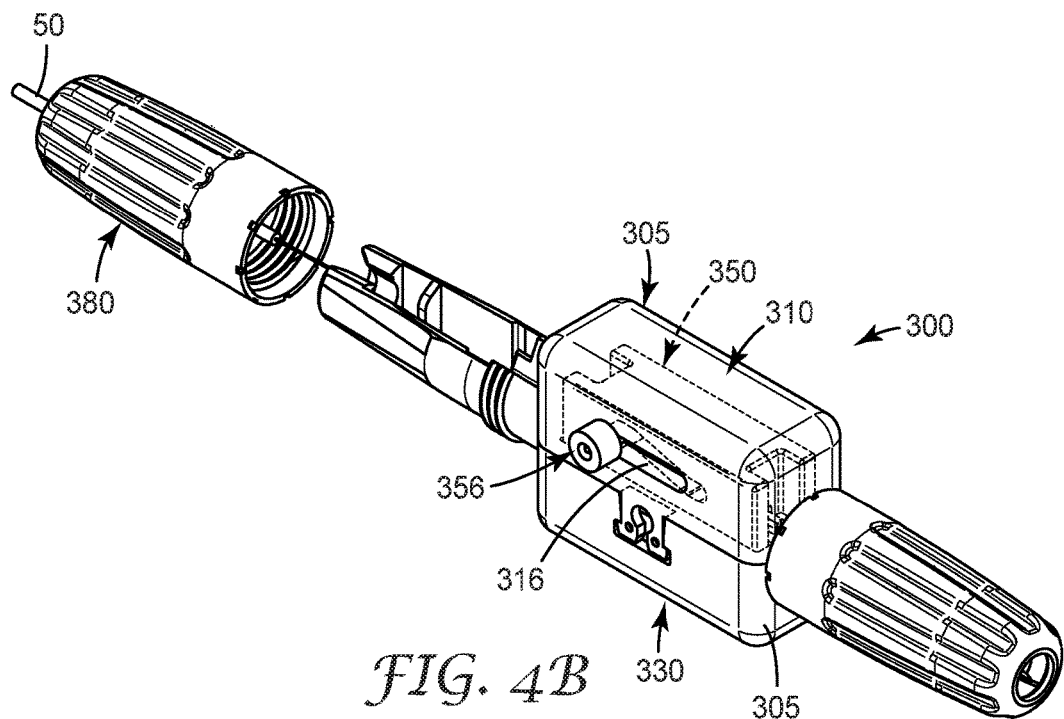
Figure 4C:
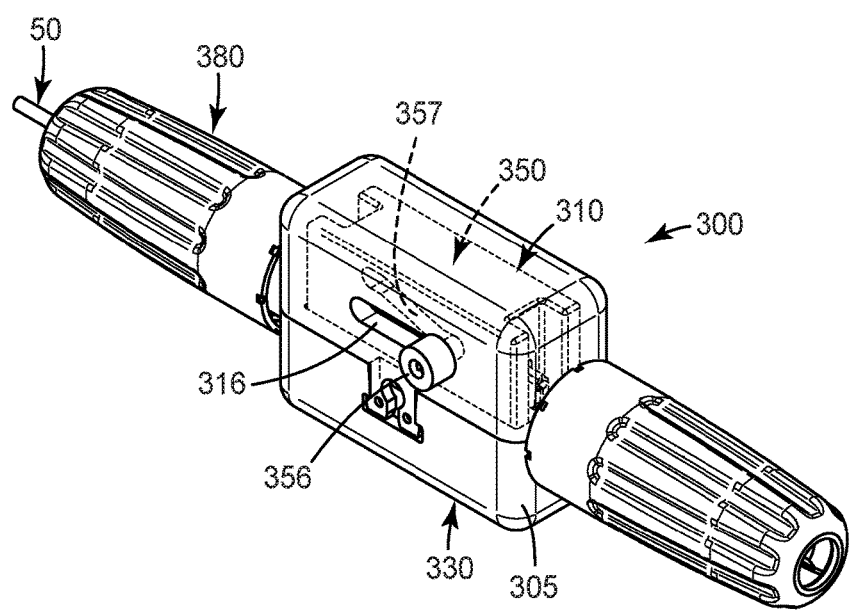

FIGS. 4A-4C show a third exemplary optical fiber connecting device 300 according to the present invention. Exemplary optical fiber connecting device 300 is structurally similar to optical fiber connecting device 100 shown in FIGS. 1A-1E except that optical fiber connecting device 300 utilizes a different actuation mechanism for opening and closing the mechanical element in the device.

Optical fiber connecting device 300 includes a main body or housing 305 having an upper housing portion 310 and a lower housing portion 330 that can be secured together by catch features 308, 309 disposed on the upper and lower housing portions. The upper and lower housing portion are configured to contain a mechanical element 360 and an actuation mechanism 350 that allows for the mechanical element to be opened and closed a plurality of times. The actuation mechanism in optical fiber connecting device 300 is a sliding switch that comprises an actuation sleeve 351 and an actuation element. The actuation mechanism can be repeatedly moved by an actuation element to open and close mechanical element 360 that is at least partially disposed in a passageway 352 extending through the actuation sleeve. Actuation sleeve 351 has inclined slot 357 extending through the actuation sleeve transverse to the passageway holding the mechanical element. The actuation element in this embodiment is an actuation bar 356.

Actuation bar 356 includes an actuation pin 356*a* and a bearing 356*b* having a hollow tubular portion. The actuation pin and the bearing can each have a knob 356*c*, 356*d* disposed on one end thereof to facilitate moving the actuation bar when it is assembled into optical fiber connecting device 300. When assembled the actuation pin is attached to the bearing by clip features 356*e* disposed on an end of the actuation pin opposite knob 356*c*.

To assemble optical fiber connecting device 300, mechanical element 360 is disposed in passageway 352 of the actuation sleeve 351 with the focus hinge 363 at the top. The actuation sleeve is placed into the upper housing portion so that the mechanical element is positioned in element holding notch (not shown) in the upper housing portion. The bearing 356*b* is inserted through a horizontal slot 316 through one the sidewalls of the upper housing portion 310 of the optical fiber connecting device and the inclined slot in the actuation sleeve from one side and actuation pin 356*a* is inserted in to the hollow tubular portion of the bearing through the horizontal slot on the other side of the upper housing portion until the clipping features 356*e* engage to secure the actuation pin to the bearing. The upper housing portion 310 is then attached to the lower housing portion 330 being sure that the ends of the mechanical element are disposed in the element holding notch 334*a* formed in the lower housing portion. After everything is engaged, the upper housing portion can be snapped to the lower housing portion engaging the catch elements 308, 309.

To terminate the first and/or the second optical fibers in optical fiber connecting device 300, the actuation bar 356 is moved to a first position opening the mechanical element as shown in FIG. 4B. Boot 380 is slipped over a stripped and cleaved of first optical fiber 50 which includes an exposed bare glass portion at its end. The bare glass portion of the optical fiber is inserted into the device until a resistance force is felt through the fiber. The actuation bar is pushed to a second position as shown in FIG. 4B to close the mechanical element around the bare glass portion of fiber 50. The boot is attached over the clamping portion to secure the device to the jacket of the optical fiber. When the second optical fiber needs to be connected, the procedure is repeated.

Figure 5A:
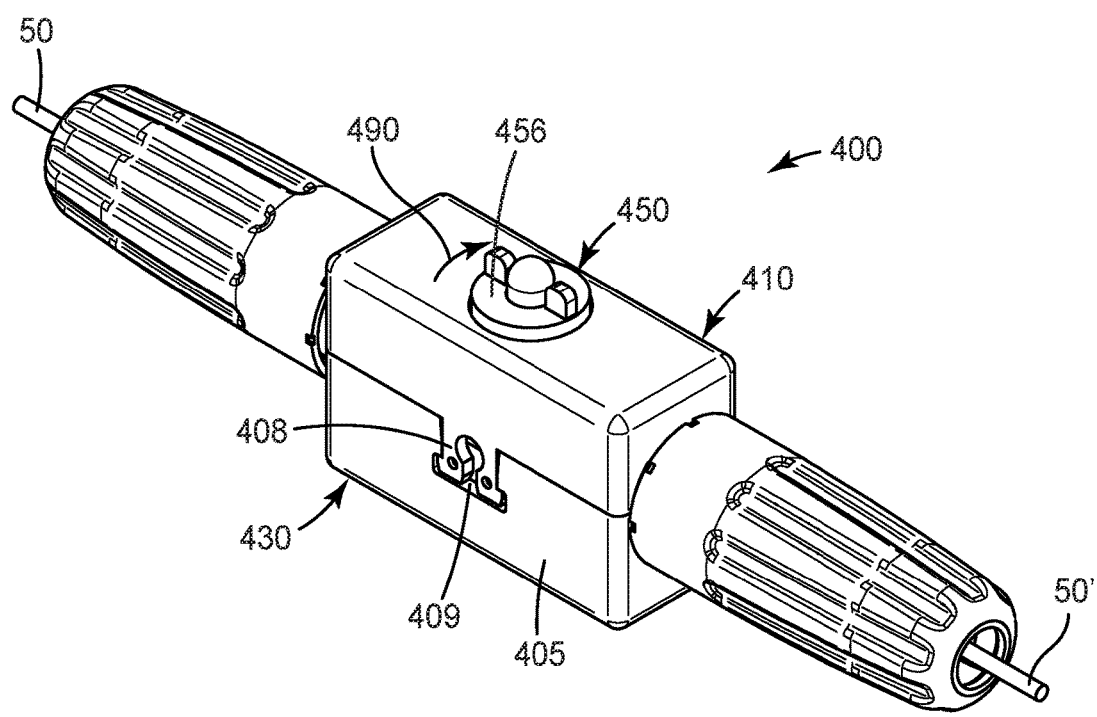
FIGS. 5A and 5B are two views of a fourth exemplary optical fiber connecting device according to the present invention.
Figure 5B:
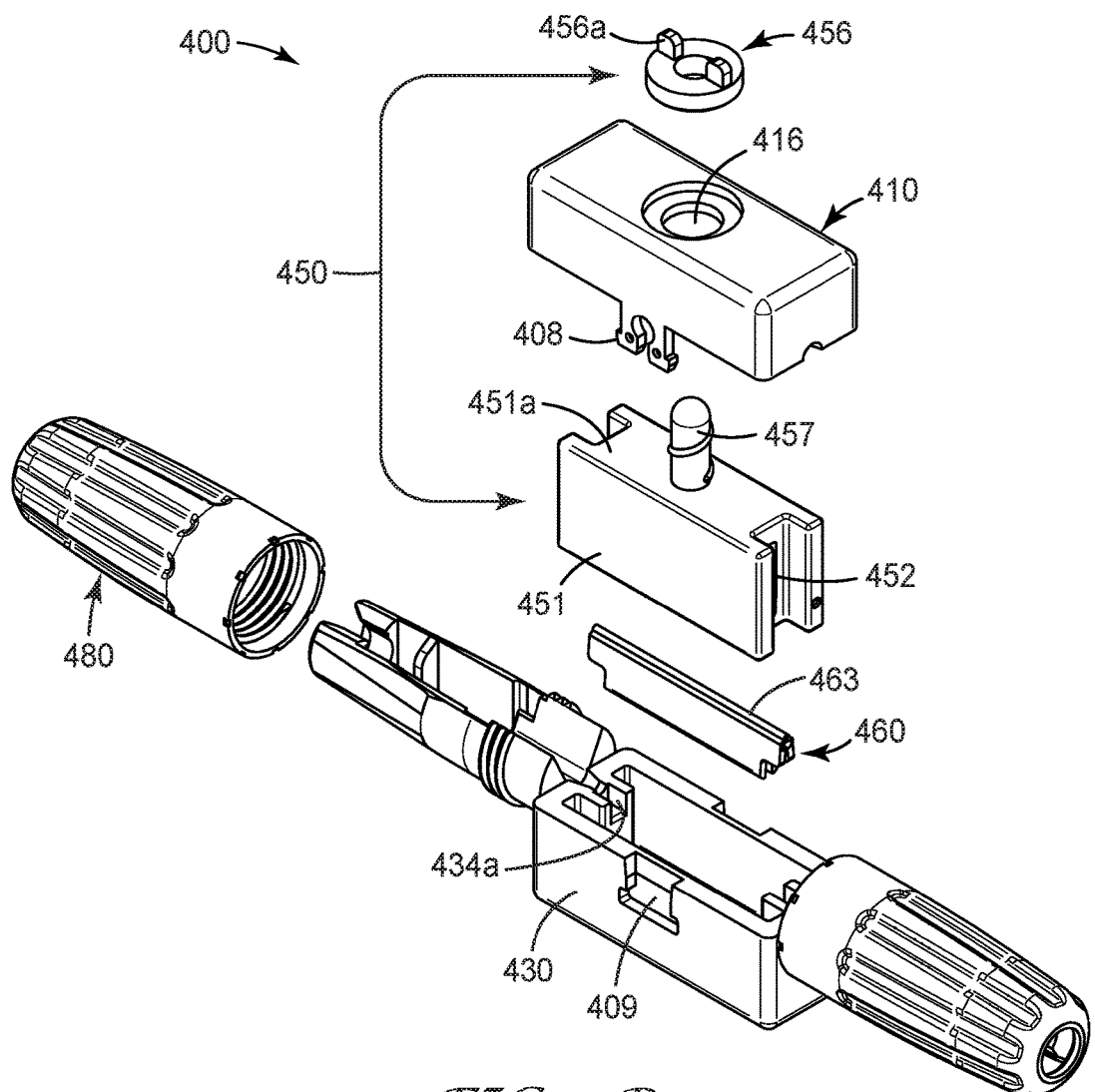

FIGS. 5A and 5B show a fourth exemplary optical fiber connecting device 400 according to the present invention. Exemplary optical fiber connecting device 400 is structurally similar to optical fiber connecting device 100 shown in FIGS. 1A-1E except that optical fiber connecting device 400 utilizes a different actuation mechanism for opening and closing the mechanical element in the device.

Optical fiber connecting device 400 includes a main body or housing 405 having an upper housing portion 410 and a lower housing portion 430 that can be secured together by catch features 408, 409 disposed on the upper and lower housing portions. The upper and lower housing portion are configured to contain a mechanical element 460 and an actuation mechanism 450 that allows for the mechanical element to be opened and closed a plurality of times. The actuation mechanism 450 is a rotating switch that comprises an actuation sleeve 451 and an actuation element that can repeatedly open and close the mechanical element that is at least partially disposed in a passageway 452 that extends through the actuation sleeve. The actuation element in this embodiment is rotating cap 456 that is threadably mounted to a peg 457 extending from a top wall 451*a* of the actuation sleeve. The rotating cap can be turned to move the actuation sleeve from a first position to a second position which in turn opens and closes the mechanical element. In an exemplary aspect, rotating cap 456 can include a pair of ears 456*a* extending from its surface to facilitate gripping and turning the rotating cap.

To assemble optical fiber connecting device 400, mechanical element 460 is disposed in passageway 452 of the actuation sleeve 451 with the focus hinge 463 at the top. The actuation sleeve is placed into the upper housing portion so that the mechanical element is positioned in element holding notch (not shown) in the upper housing portion. Threaded peg 457 is inserted through recessed opening 316 in the upper housing portion and the rotating cap 456 is attached thereto. The upper housing portion 410 is then attached to the lower housing portion 430 being sure that the ends of the mechanical element are disposed in the element holding notch 434*a* formed in the lower housing portion. After everything is engaged, the upper housing portion can be snapped to the lower housing portion engaging the catch elements 408, 409.

To terminate the first and/or the second optical fibers in optical fiber connecting device 400, the rotating cap 456 is moved to a first position opening the mechanical element. Boot 480 is slipped over a stripped and cleaved end of the optical fiber being terminated. The bare glass portion of said optical fiber is inserted into the device until a resistance force is felt through the fiber. The rotating cap is turned to a second position to close the mechanical element around the bare glass portion of the fiber. The boot is attached over the clamping portion to secure the device to the jacket of the optical fiber. When the second optical fiber needs to be connected, the procedure is repeated.

FIGS. 6A-6D show a fifth exemplary optical fiber connecting device 500 according to the present invention. Exemplary optical fiber connecting device 500 is structurally similar to optical fiber connecting device 100 shown in FIGS. 1A-1E except that optical fiber connecting device 500 utilizes a different actuation mechanism for opening and closing the mechanical element in the device.

Optical fiber connecting device 500 includes a main body or housing 505 having an upper housing portion 510 and a lower housing portion 530 that can be secured together by catch features (not shown) disposed on the upper and lower housing portions. The upper and lower housing portion are configured to contain a mechanical element 560 and an actuation mechanism 550 that allows for the mechanical element to be opened and closed a plurality of times. The actuation mechanism is a sliding switch that comprises an actuation sleeve 551 that can be repeatedly moved by an actuation element to open and close mechanical element 560 that is at least partially disposed in a passageway 552 and an actuation element. Actuation sleeve 551 has inclined slot 557 extending through the actuation sleeve transverse to the passageway holding the mechanical element. The actuation element in this embodiment is an actuation sled 556.

Figure 6A:
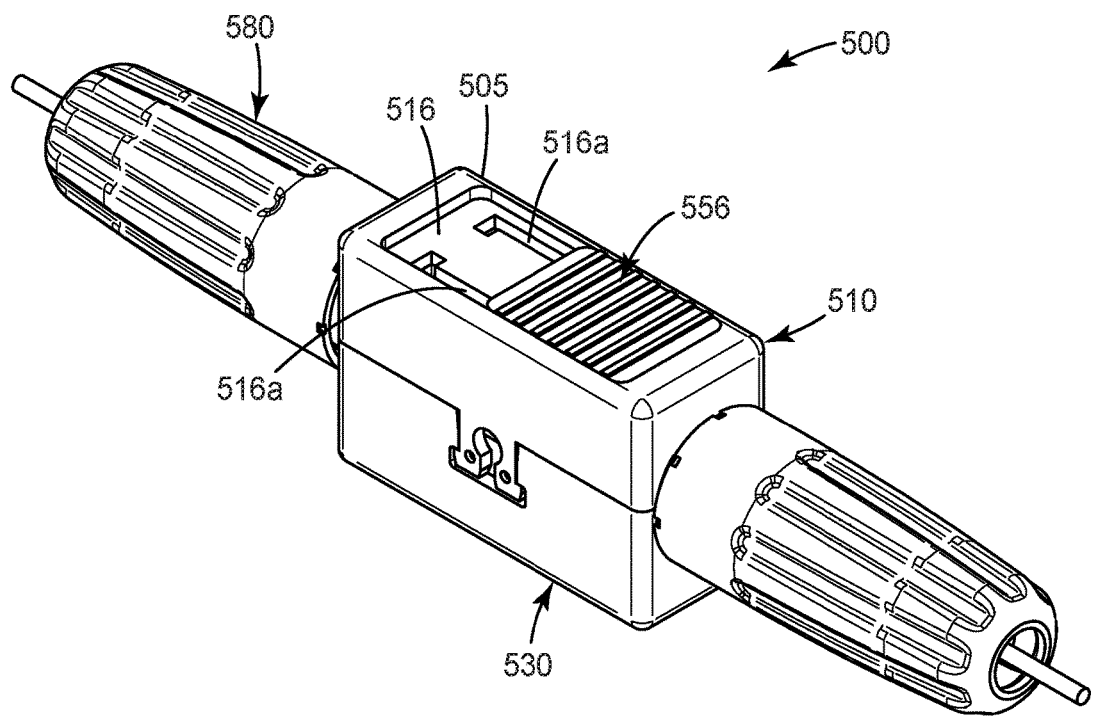
FIGS. 6A-6D are four views of a fifth exemplary optical fiber connecting device according to the present invention.
Figure 6B:
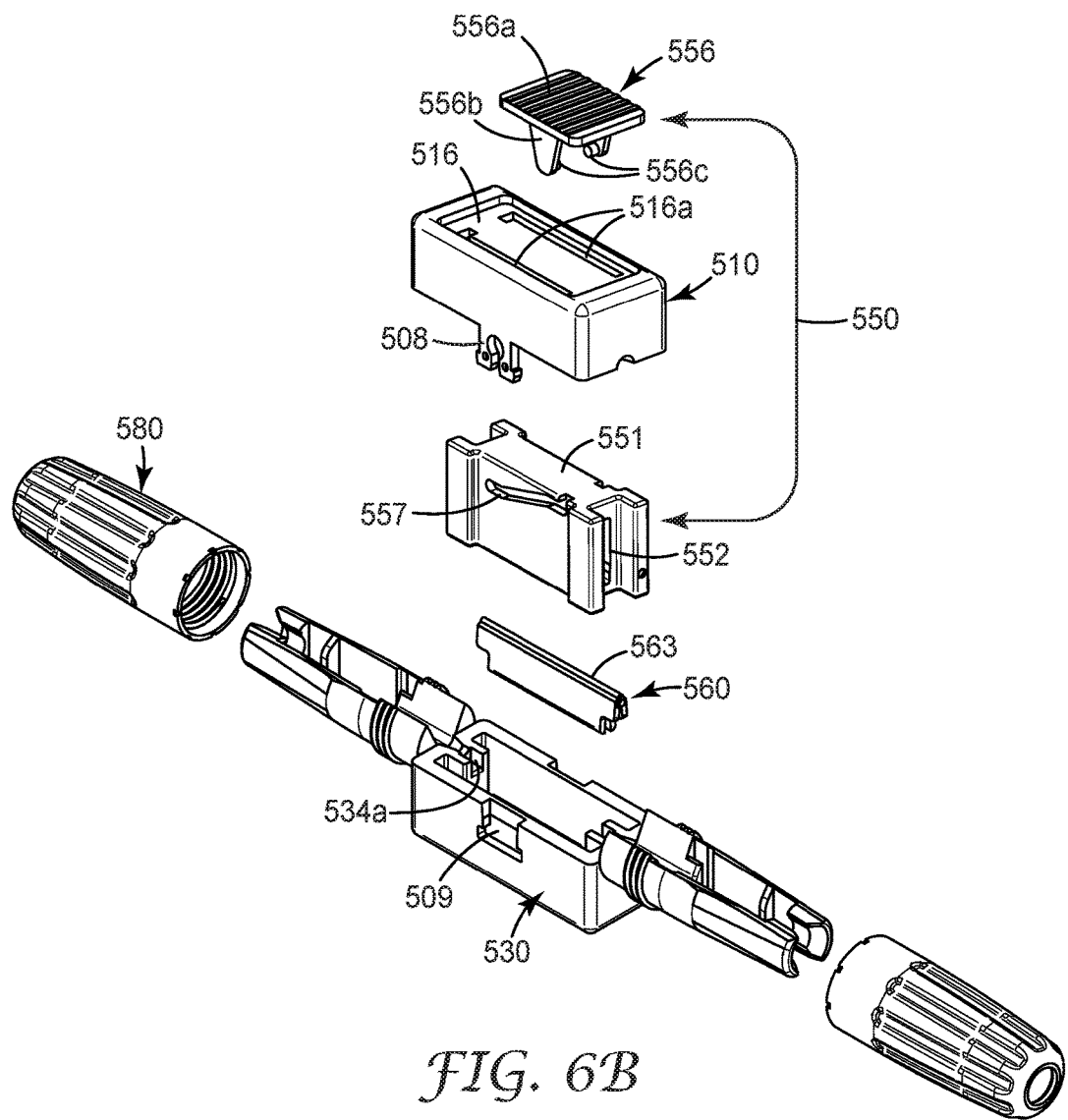

Actuation sled 556 includes can include an actuation platform 556a and a pair of extension members 556b extending from opposite edges of and beneath the actuation platform as shown in FIG. 6B. A runner protrusion 556c extends from the inside surface of each extension member. The runner protrusions fit into inclined slot 557 of the actuation sleeve to move the actuation sleeve from a first position to a second position to open and close mechanical element 560 of the exemplary optical fiber connecting device. In an exemplary aspect, the top surface of the actuation platform can include a textured surface to provide traction and to facilitate actuating/de-actuating the actuation mechanism. The actuation sled can reside in a recessed portion 516 of the top surface of the upper housing portion 510 in the assembled optical fiber connecting device.

To assemble optical fiber connecting device 500, mechanical element 560 is disposed in passageway 552 of the actuation sleeve 551 with the focus hinge 563 at the top. The actuation sleeve is placed into the upper housing portion 510 so that the mechanical element is positioned in element holding notch (not shown) in the upper housing portion. The runner protrusions 556c and the extension members 556b of the actuation sled are inserted through slots 516a disposed through the recessed portion 516 in the top surface of the upper housing portion. The runner protrusion are snapped into the inclined slot 557 of the actuation sleeve. The upper housing portion is then attached to the lower housing portion 530 being sure that the ends of the mechanical element are disposed in the element holding notch 534a formed in the lower housing housing portion. After everything is engaged, the upper housing portion can be snapped to the lower housing portion engaging the catch elements 508, 509. In this embodiment optical fiber connecting device has one set of catch elements on each side of housing 505.

Figure 6C:
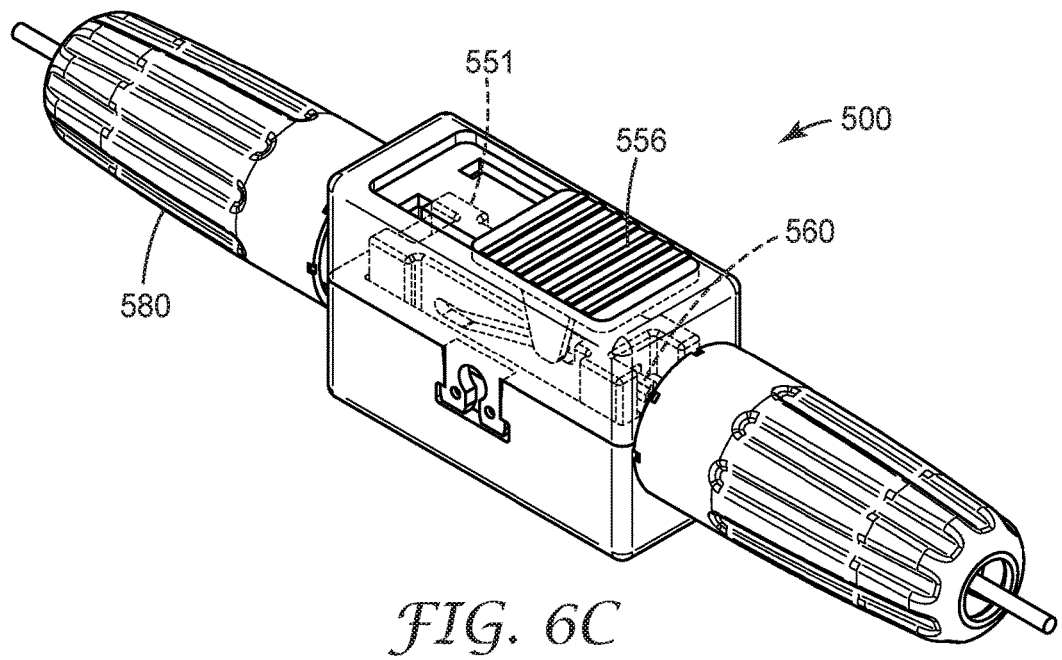
Figure 6D:
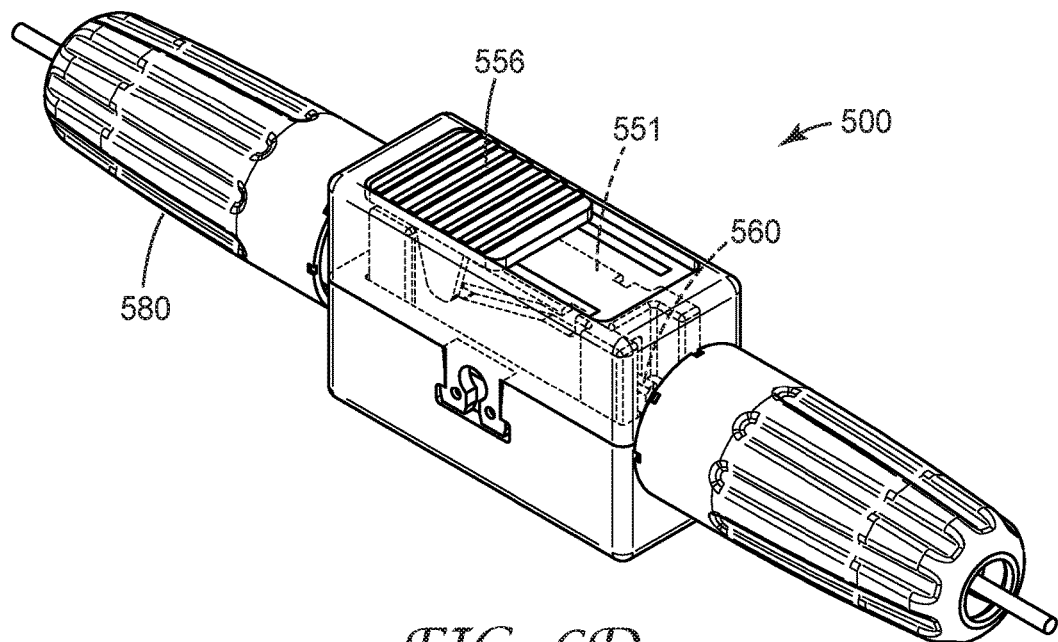

To terminate the first and/or the second optical fibers in optical fiber connecting device 500, the actuation sled 556 is moved to a first position opening the mechanical element 560 as shown in FIG. 6C. Boot 580 is slipped over a stripped and cleaved end of the first optical fiber being terminated. A bare glass portion at the terminal end of said optical fiber is inserted into the device until a resistance force is felt through the fiber. The actuation sled is pushed to a second position as shown in FIG. 6D lifting the actuation sleeve 551 and closing the mechanical element around the bare glass portion of the fiber. The boot is attached over the clamping portion to secure the device to the jacket of the optical fiber. When the second optical fiber needs to be connected, the procedure is repeated.

FIGS. 7A-7D show a sixth exemplary optical fiber connecting device 600 according to the present invention. Exemplary optical fiber connecting device 600 is structurally similar to optical fiber connecting device 100 shown in FIGS. 1A-1E except that optical fiber connecting device 600 utilizes a different actuation mechanism for opening and closing the mechanical element in the device.

Optical fiber connecting device 600 includes a main body or housing 605 having an upper housing portion 610 and a lower housing portion 630 that can be secured together by catch features (not shown) disposed on the upper and lower housing portions. The upper and lower housing portion are configured to contain a mechanical element 660 and an actuation mechanism 650 that allows for the mechanical element to be opened and closed a plurality of times. The actuation mechanism is a switch that comprises an actuation sleeve 651 that can be repeatedly moved by an actuation element to open and close mechanical element 660 and an actuation element. Actuation sleeve 651 has a peg 657 extending from a top wall 651a of the actuation sleeve. The peg includes an inclined slit 657a disposed near the top of the peg. The actuation element in this embodiment is a switch lever 656.

Switch lever 656 includes a lever member having a forked end 656a, a mid-portion 656b attached to the forked end, and bent end 656c attached to the mid-portion opposite the forked end. A rod 656f extends between the tines 656d of the forked end and is configured to engage with the inclined slit 657a in the peg 657 of the actuation sleeve 651. A pivot protrusion 656e extends from the outside edge of each tine. In an exemplary aspect, the rod and the pivot protrusion are offset from one another so that when the switch lever is rotated (as indicated by directional arrow 699 in FIG. 7C) with respect to the pivot protrusions, the rod lifts the actuation sleeve moving the actuation sleeve from a first position (FIGS. 7A and 7C) to a second position (FIG. 7D) to open and close mechanical element 660 of the exemplary optical fiber connecting device 600.

Figure 7A:
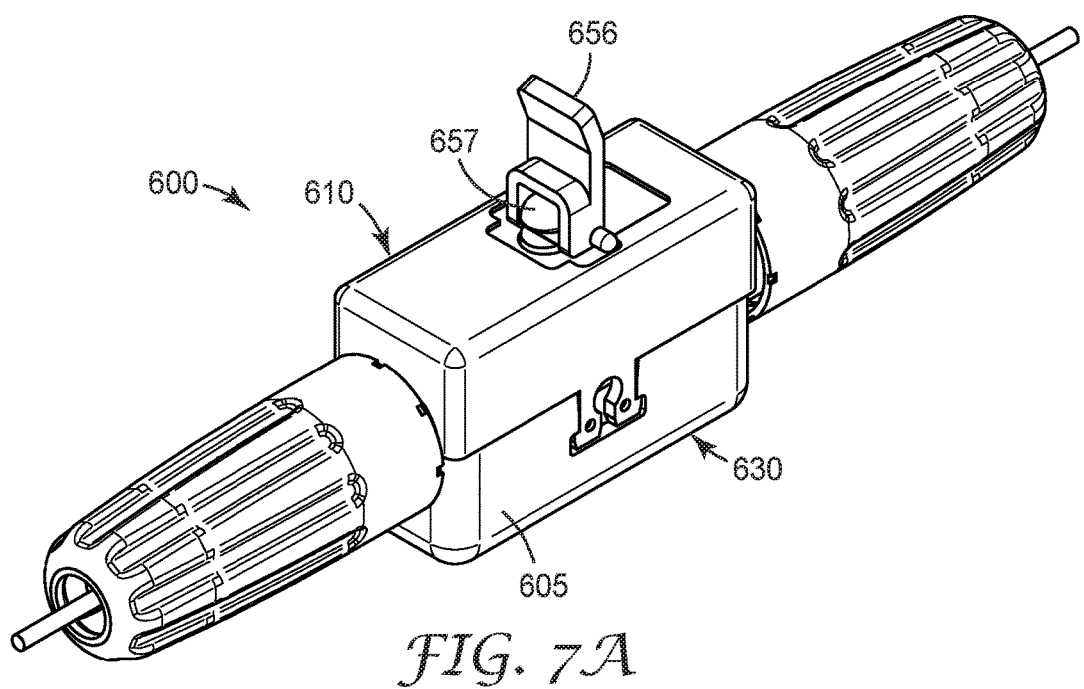
FIGS. 7A-7D are four views of a sixth exemplary optical fiber connecting device according to the present invention.
Figure 7B:
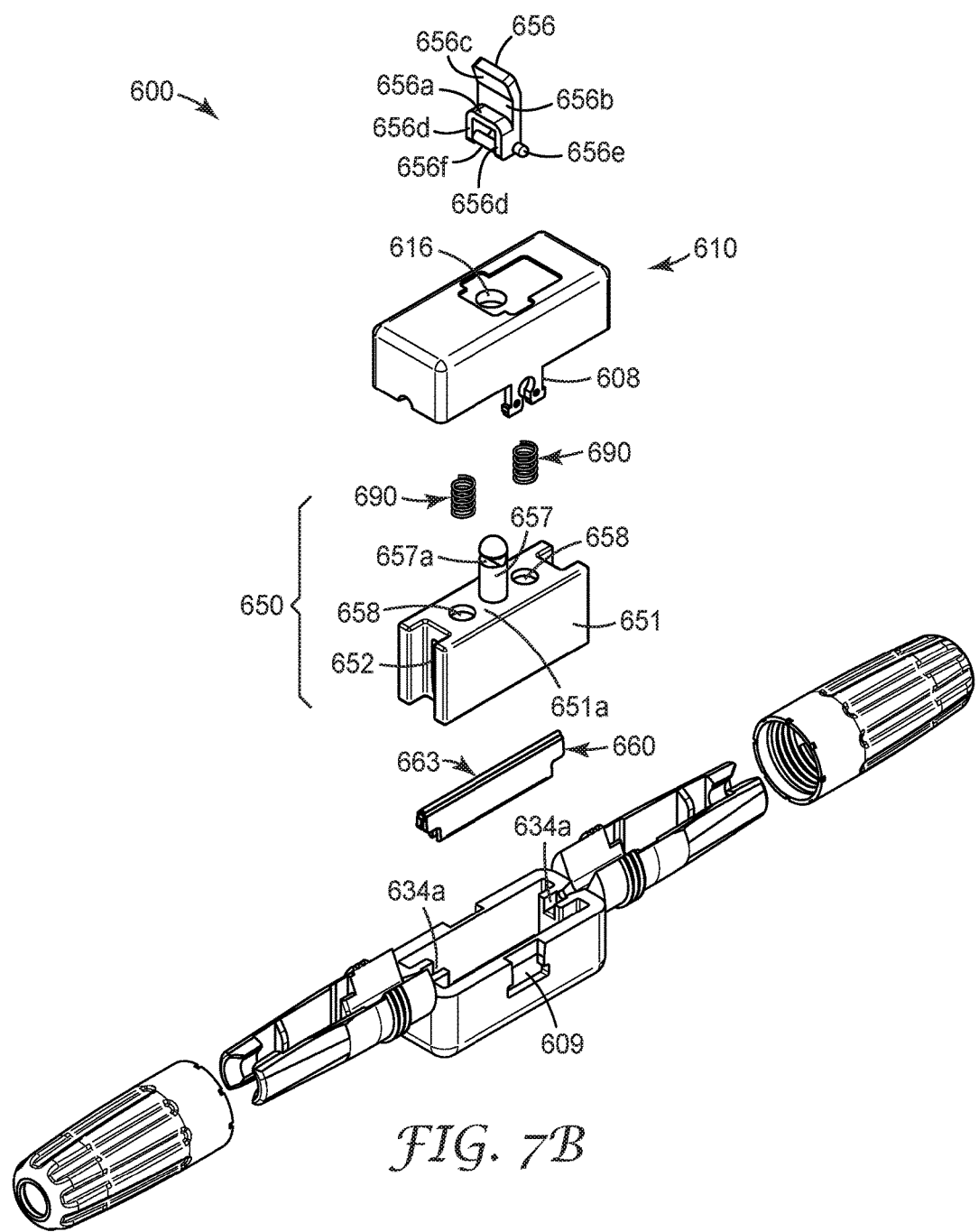
Figure 7C:
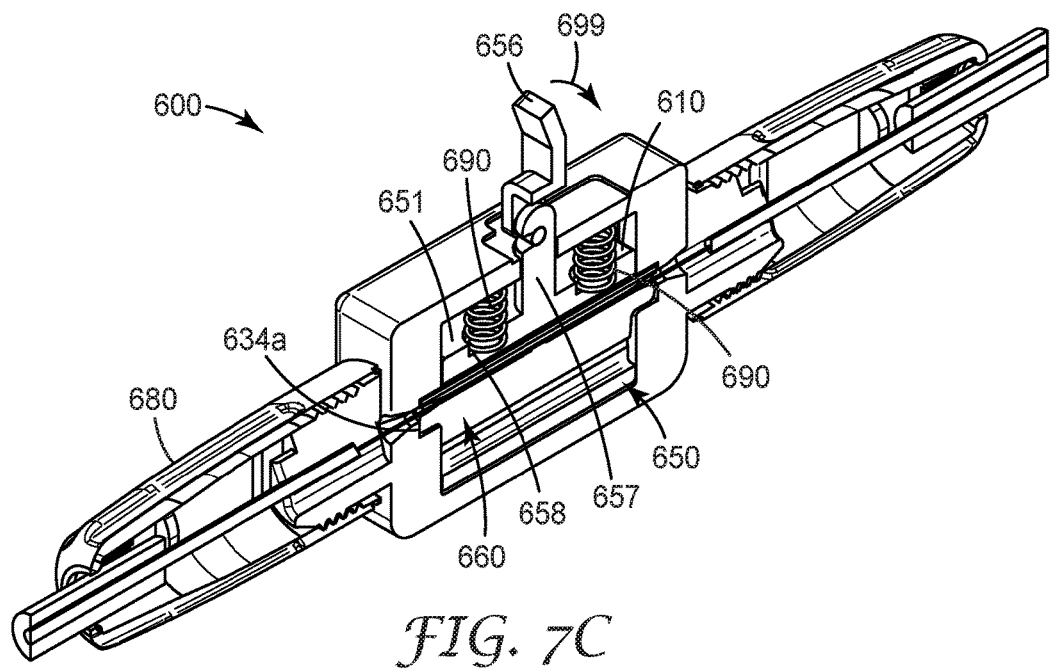

In the exemplary embodiment shown in FIGS. 7A-7D, the actuation mechanism includes a pair of springs 690 disposed on either side of peg 657 between the actuation sleeve 651 and the inside top wall of the upper housing portion 610. The position of the springs is maintained by placing an end of each spring in a cylindrical divot 658 in the top surface 651a of the actuation sleeve. The springs push the actuation sleeve 651 downward when the switch lever 656 is flipped to open the mechanical element 660 as shown in FIG. 7C. The switch lever pulls up the actuation sleeve when it is moved to the position shown in FIG. 7D to close the mechanical element.

The bent portion 656c of the switch lever 656 enables the lifting of the switch lever from a second position back to the first position to open the mechanical element 660.

To assemble optical fiber connecting device 600, mechanical element 660 is disposed in passageway 652 of the actuation sleeve 651 with the focus hinge 663 at the top and the springs 690 are placed in cylindrical divots 658. The actuation sleeve is placed into the upper housing portion 610 such that peg 657 extends through opening 616 in the upper housing portion. Pushing the actuation sleeve into the upper housing portion compresses the springs and positions the mechanical element in element holding notches (not shown) of the upper housing portion. The rod 656f in the forked end 656a of the lever switch 656 is inserted into the inclined slit 657a in the peg 657. The upper housing portion 610 is then attached to the lower housing portion 630 being sure that the ends of the mechanical element are disposed in the element holding notch 634a formed in the lower housing portion. After everything is engaged, the upper housing portion can be snapped to the lower housing portion engaging the catch elements 608, 609.

Figure 7D:
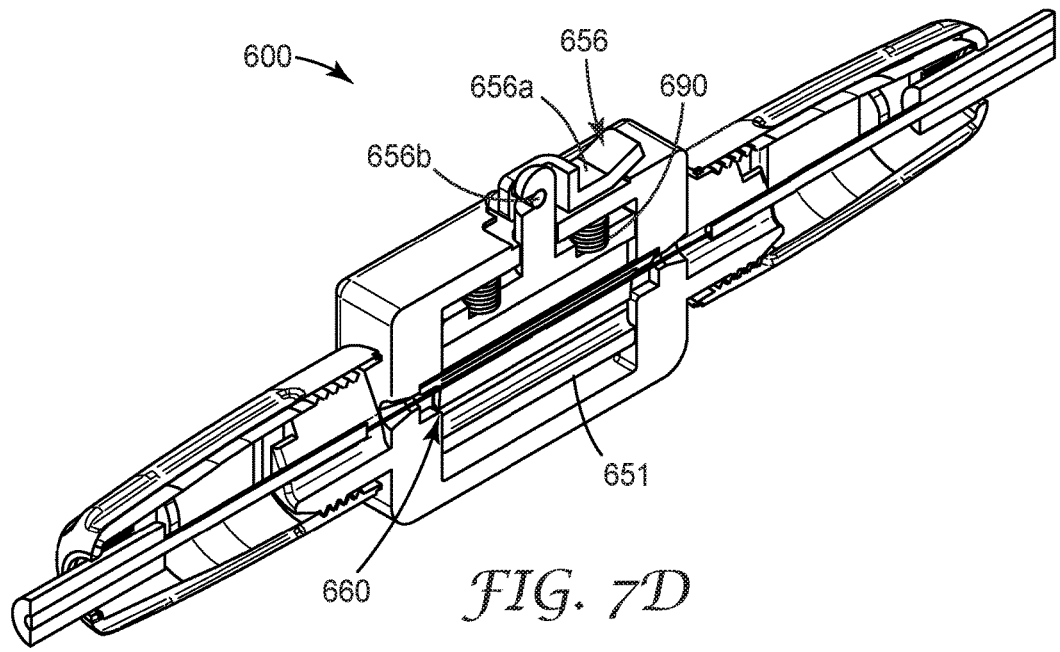

To terminate the first and/or the second optical fibers in optical fiber connecting device 600, the switch lever 656 is moved to a first position opening the mechanical element as shown in FIG. 7C. Boot 680 is slipped over a stripped and cleaved end of the first optical fiber being terminated. A bare glass portion at the terminal end of said optical fiber is inserted into the device until a resistance force is felt through the fiber. The switch lever is rotated (as indicated by directional arrow 699) to a second position as shown in FIG. 7D lifting the actuation sleeve and closing the mechanical element around the bare glass portion of the fiber. The boot is attached over the clamping portion to secure the device to the jacket of the optical fiber. When the second optical fiber needs to be connected, the procedure is repeated.

Figure 8A:
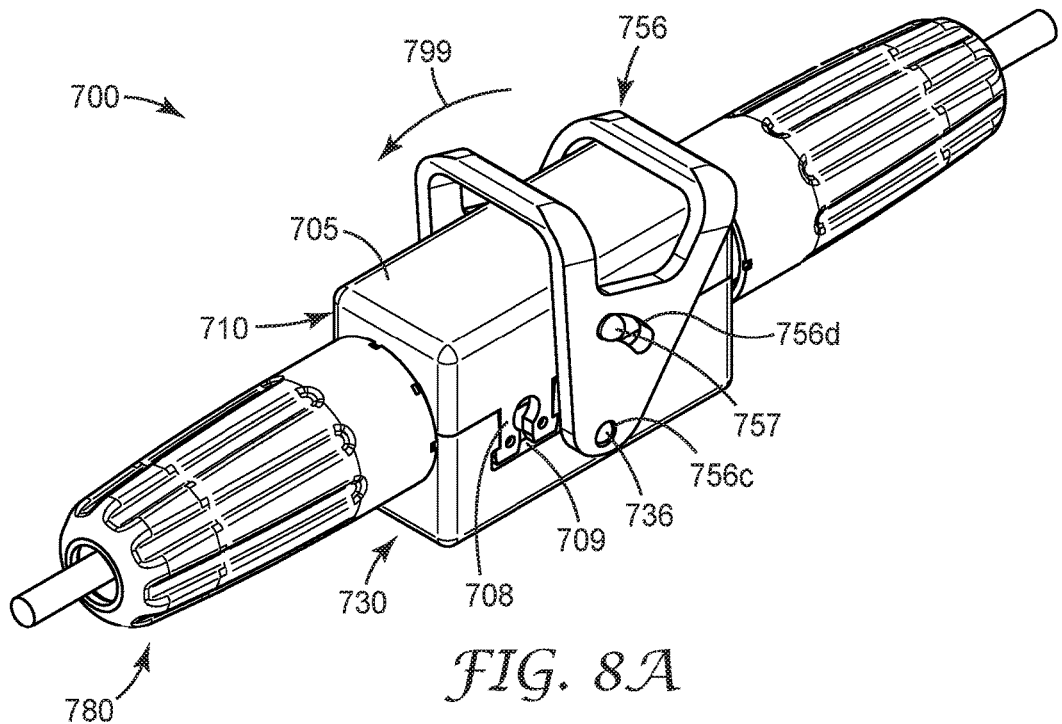
FIGS. 8A-8C are three views of a seventh exemplary optical fiber connecting device according to the present invention.
Figure 8C:
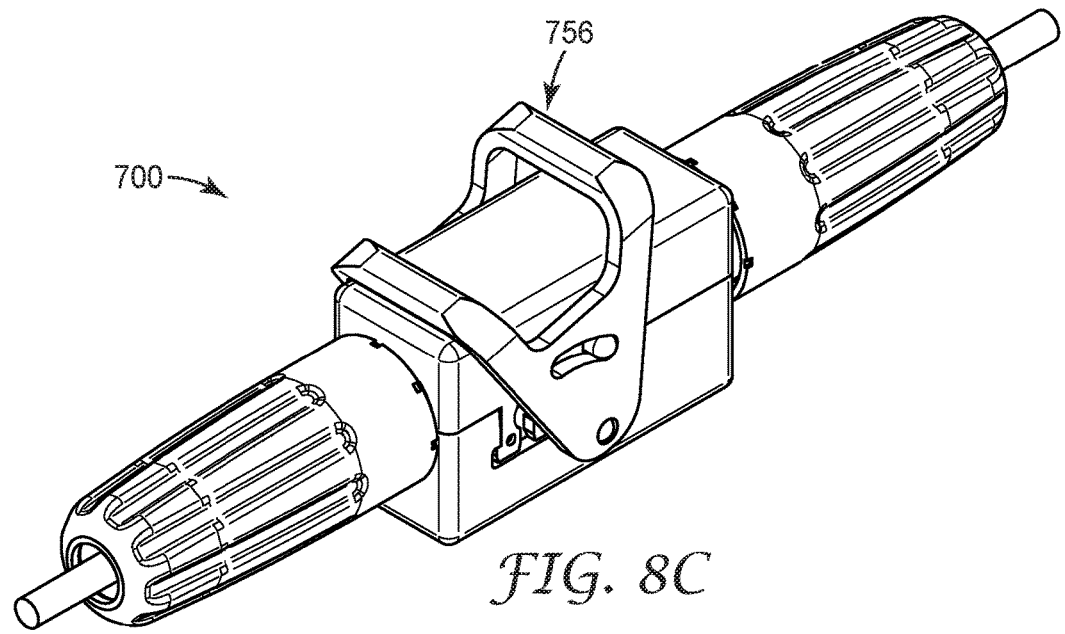
Figure 8B:
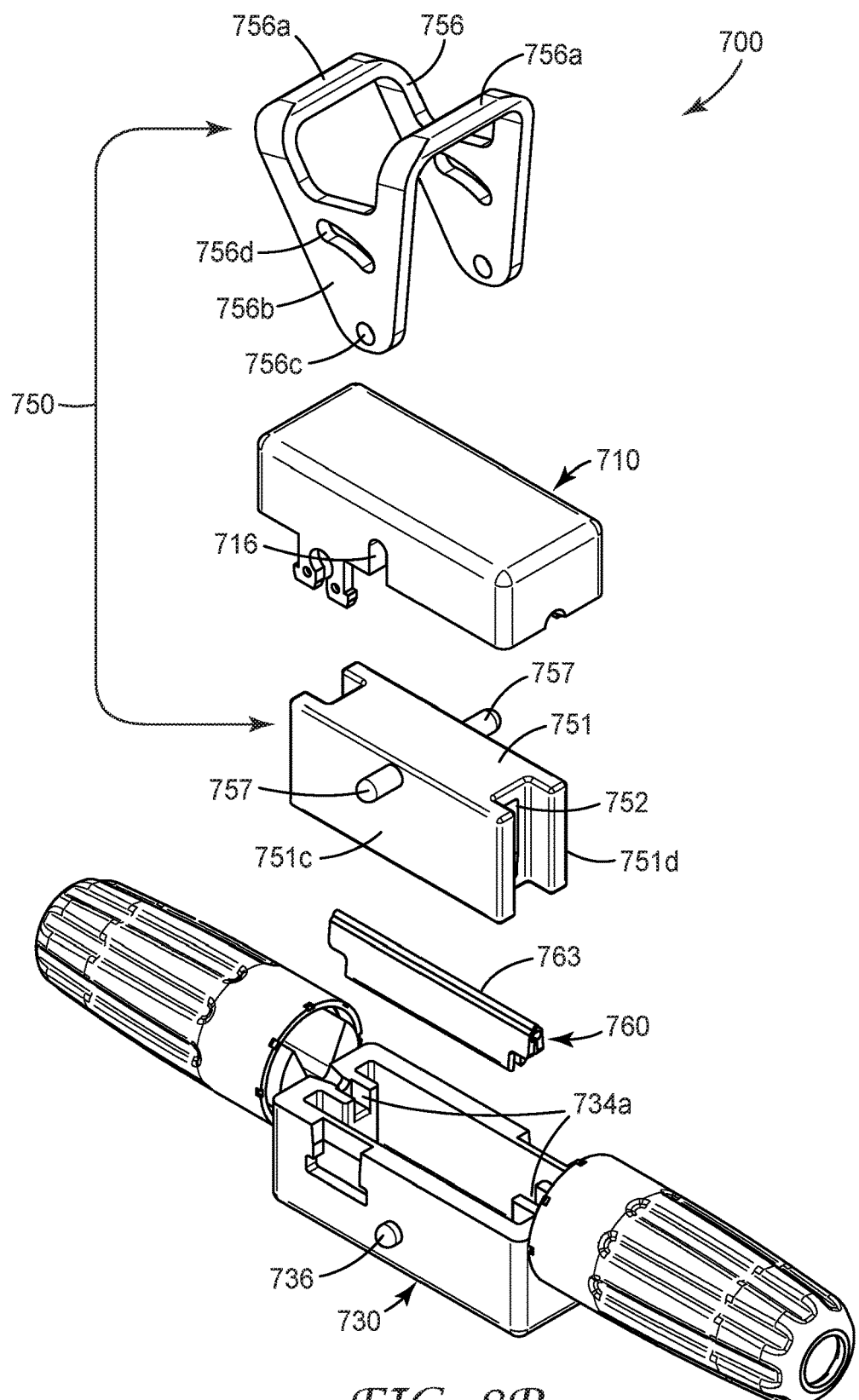

FIGS. 8A-8C show a seventh exemplary optical fiber connecting device 700 according to the present invention. Exemplary optical fiber connecting device 700 is structurally similar to optical fiber connecting device 100 shown in FIGS. 1A-1E except that optical fiber connecting device 700 utilizes a different actuation mechanism for opening and closing the mechanical element in the device.

Optical fiber connecting device 700 includes a main body or housing 705 having an upper housing portion 710 and a lower housing portion 730 that can be secured together by catch features disposed on the upper and lower housing portions. The upper and lower housing portion are configured to contain a mechanical element 760 and an actuation mechanism 750 that allows for the mechanical element to be opened and closed a plurality of times. The actuation mechanism is a toggle switch that comprises an actuation sleeve 751 and an actuation element that can be repeatedly moved by an actuation element to open and close the mechanical element. Actuation sleeve 751 has lift pegs 757 extending from the side walls of the actuation sleeve. The actuation element in this embodiment is a toggle switch 756.

Toggle switch 756 can be generally triangular or wedge shaped and includes two handle portions 756a extending between a pair of triangular attachment portions 756b. The attachment portions each include an opening 756c at the apex of the attachment portions which engage with pivot protrusions 736 extending from the side walls of lower body portion 730 of optical fiber connecting device 700 and a pair of arced lifting slots 756d that engage with the lifting pegs 757 extending from the side walls 751c, 751d of actuation sleeve 751. The toggle switch lifts the actuation sleeve when it is moved (as indicated by arrow 799) from a first position (FIG. 8A) to a second position (FIG. 8C) to open and close mechanical element 760 of the exemplary optical fiber connecting device.

To assemble optical fiber connecting device 700, mechanical element 760 is disposed in passageway 752 of the actuation sleeve 751 with the focus hinge 763 at the top. The actuation sleeve is placed into the lower housing portion 730 positioning the ends of the mechanical element are disposed element holding notches 734a formed in the lower housing portion. The upper housing portion 710 is then attached to the lower housing portion being sure to align the lifting pegs 757 with gaps 716 formed in the side walls of the upper housing portion and the ends of the mechanical element are disposed in the element holding notches (not shown) formed in the upper housing portion. After everything is engaged, the upper housing portion can be snapped to the lower housing portion engaging the catch elements 708, 709.

To terminate the first and/or the second optical fibers in optical fiber connecting device 700, the toggle switch 756 is moved to a first position opening the mechanical element as shown in FIG. 8A. Boot 780 is slipped over a stripped and cleaved end of the first optical fiber being terminated. A bare glass portion at the terminal end of said optical fiber is inserted into the device until a resistance force is felt through the fiber. The switch lever is rotated to a second position as shown in FIG. 8C lifting the actuation sleeve and closing the mechanical element around the bare glass portion of the fiber. The boot is attached over the clamping portion to secure the device to the jacket of the optical fiber. When the second optical fiber needs to be connected, the procedure is repeated.

FIGS. 9A-9D show an eighth exemplary optical fiber connecting device 800 according to the present invention. Exemplary optical fiber connecting device 800 is structurally similar to optical fiber connecting device 100 shown in FIGS. 1A-1E except that optical fiber connecting device 800 utilizes a different actuation mechanism for opening and closing the mechanical element in the device.

Optical fiber connecting device 800 includes a main body or housing 805 having an upper housing portion 810 and a lower housing portion 830 that can be secured together by catch features disposed on the upper and lower housing portions. The upper and lower housing portion are configured to contain a mechanical element 860 and an actuation mechanism 850 that allows for the mechanical element to be opened and closed a plurality of times. The actuation mechanism is an inline switch that comprises an actuation sleeve 851 and an actuation element that can be repeatedly moved by an actuation element to open and close mechanical element 860. Actuation sleeve 851 has lift pegs 857 extending from the side walls 851c. 851d of the actuation sleeve. The actuation element in this embodiment is an actuation sled 856.

Figure 9A:
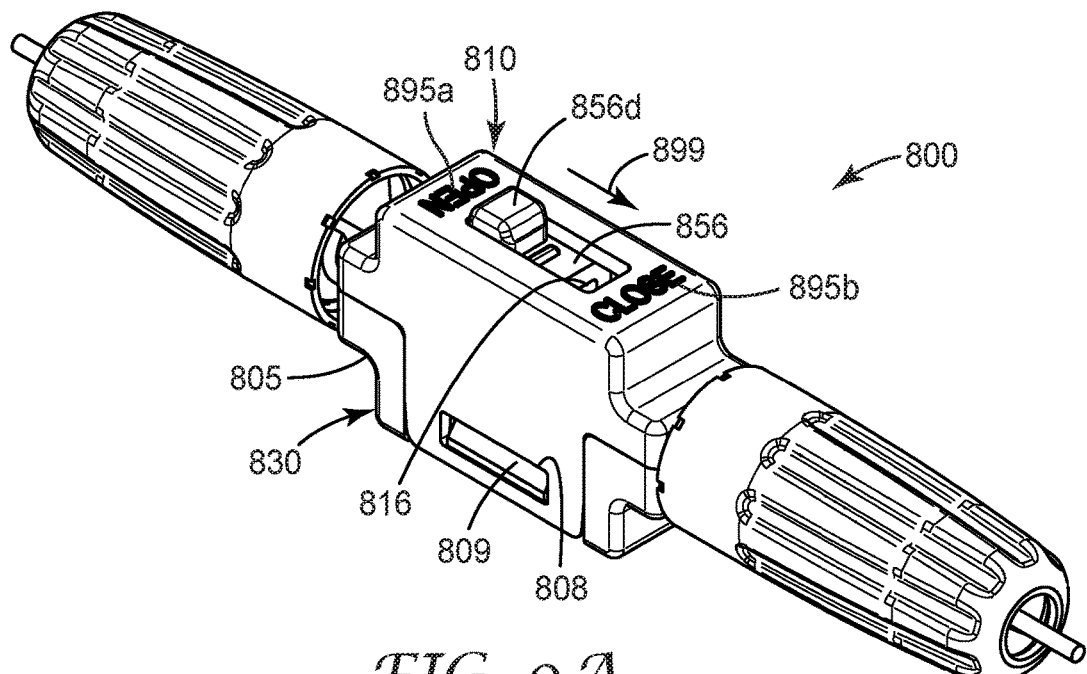
FIGS. 9A-9D are four views of an eighth exemplary optical fiber connecting device according to the present invention.
Figure 9B:
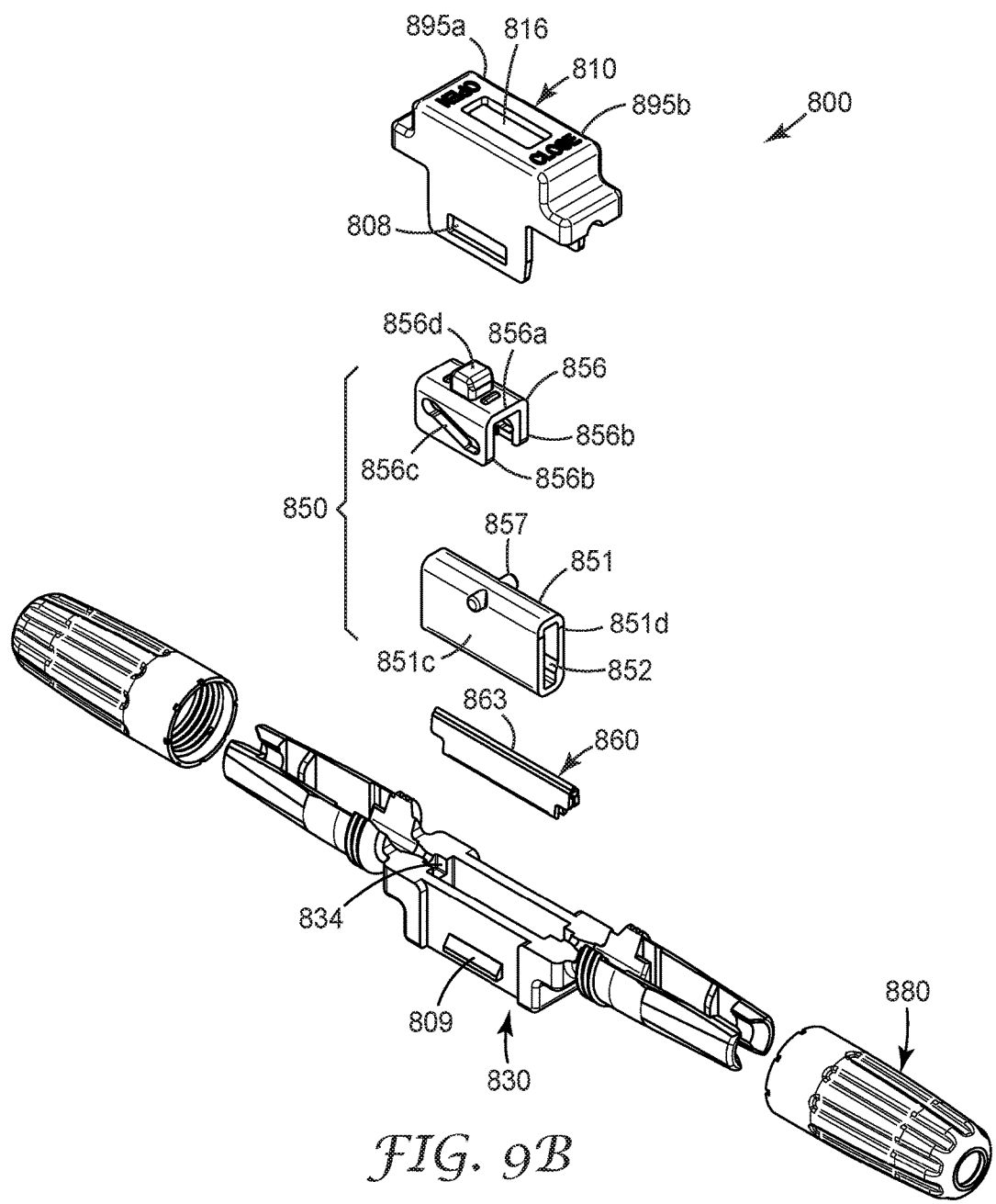

Actuation sled 856 includes an actuation platform 856a and a pair of extension members 856b extending from opposite edges of and beneath the actuation platform as shown in FIG. 9B. An inclined slot 856c is formed through each extension member and is configured to receive the lifting pegs 857 extending from actuation sleeve 851. The inline switch can include a knob 856d formed on top of the actuation sled that extends through a slot 816 formed through the upper housing portion off in the fully assembled optical fiber connecting device. When the knob is slid as indicated by directional arrow 899 in FIG. 9A, the actuation sled lifts the actuation sleeve from a first position where the mechanical element 860 is open to a second position closing mechanical element of the exemplary optical fiber connecting device.

In an exemplary aspect, indicia 895a. 895b can be formed in the top wall of the upper housing portion 810 to indicate whether the mechanical element contained within the housing 805 of the optical fiber connecting device is open or closed.

To assemble optical fiber connecting device 800, mechanical element 860 is disposed in passageway 852 of the actuation sleeve 851 with the focus hinge 863 at the top. The actuation sled 856 is attached to the actuation sleeve by fitting the lifting pegs 857 on the actuation sleeve into the inclined slots 856c in the actuation sled. The actuation sleeve is placed into the lower housing portion 830 so that the ends of mechanical element 860 are positioned in element holding notches 834 formed in the lower housing portion. The upper housing portion 810 is then attached to the lower housing portion being sure that the ends of the mechanical element are disposed in the element holding notches (not shown) formed in the upper housing portion. After everything is engaged, the upper housing portion can be snapped to the lower housing portion engaging the catch elements 808, 809.

Figure 9C:
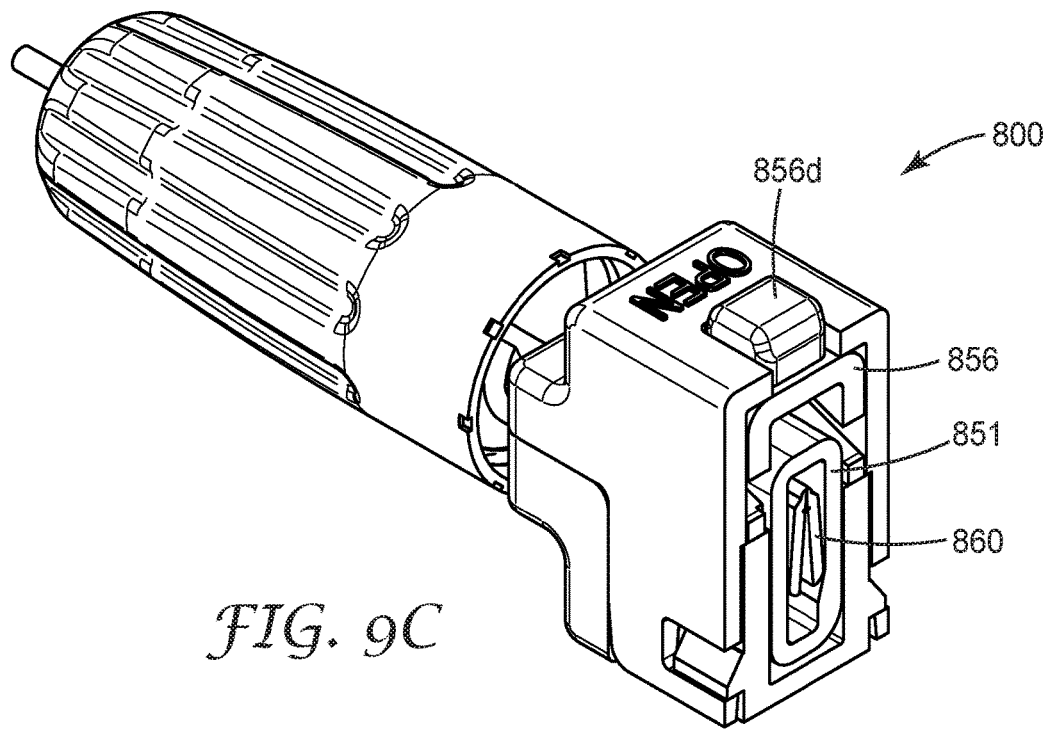
Figure 9D:
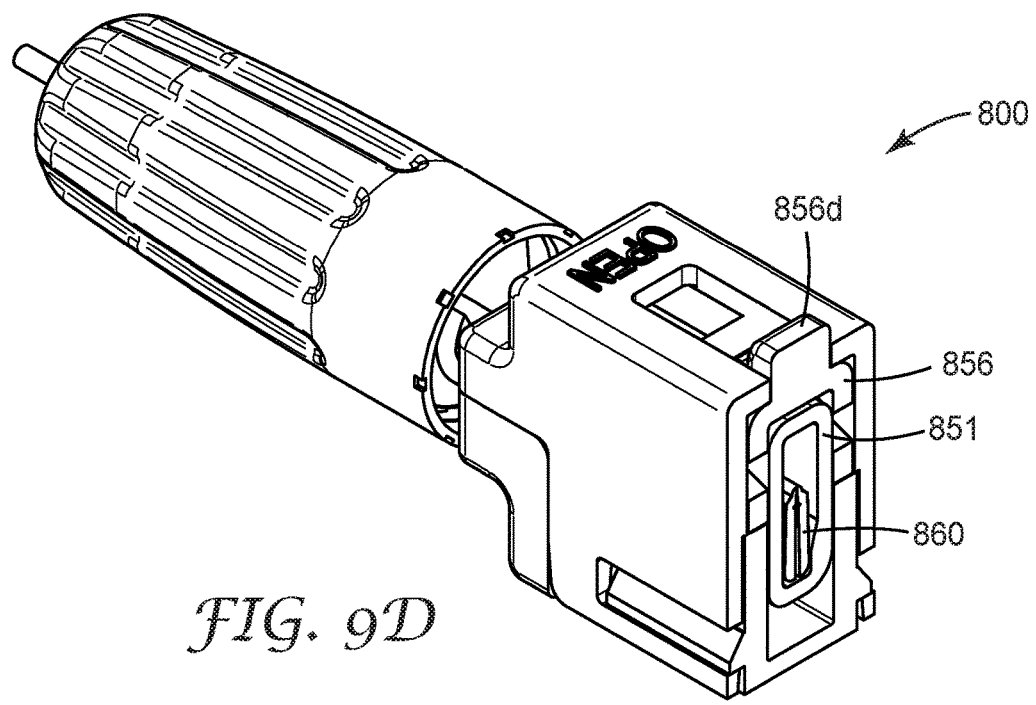

To terminate the first and/or the second optical fibers in optical fiber connecting device 800, the actuation sled 856 is moved to a first position opening the mechanical element 860 as shown in FIG. 9C. Boot 880 is slipped over a stripped and cleaved end of the first optical fiber being terminated. A bare glass portion at the terminal end of said optical fiber is inserted into the device until a resistance force is felt through the fiber. The actuation sled is pushed to a second position as shown in FIG. 9D lifting the actuation sleeve 851 and closing the mechanical element around the bare glass portion of the fiber. The boot is attached over the clamping portion to secure the device to the jacket of the optical fiber. When the second optical fiber needs to be connected, the procedure is repeated.

Figure 10A:
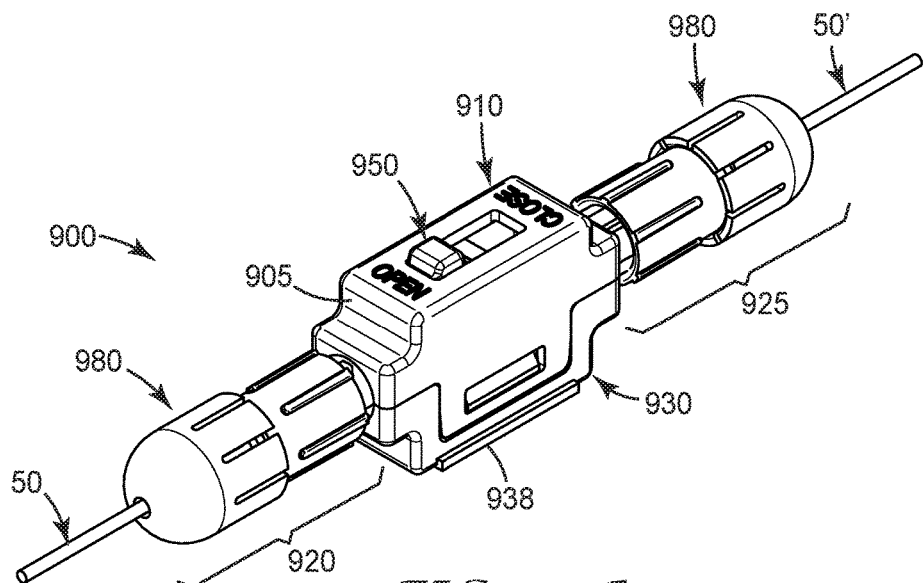
FIGS. 10A-10C are three views of a ninth exemplary optical fiber connecting device according to the present invention.
Figure 10B:
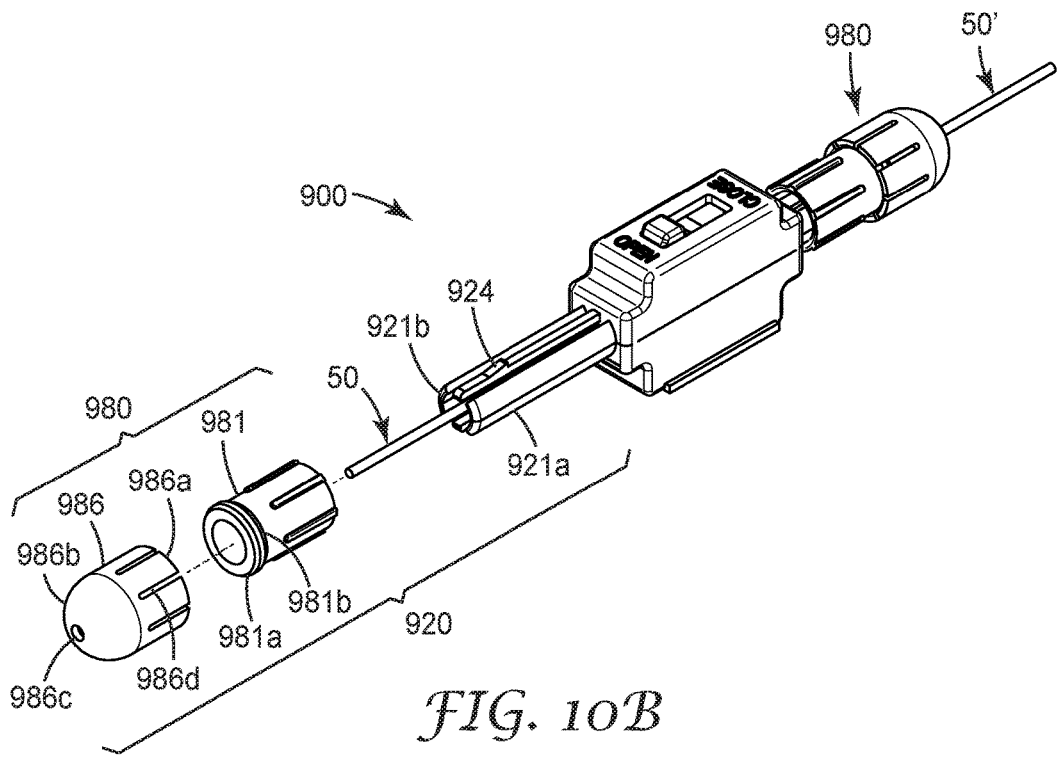
Figure 10C:
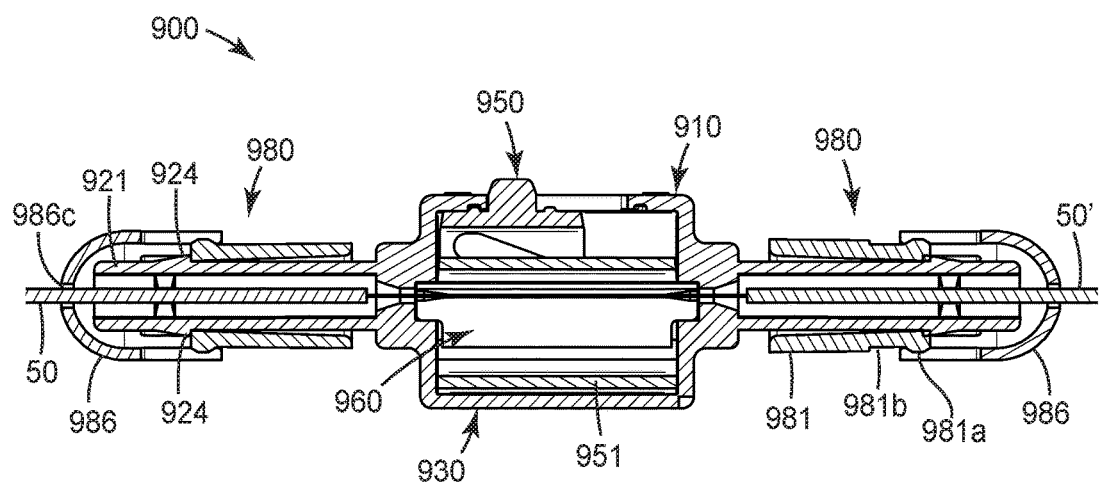

FIGS. 10A-10C show a ninth exemplary optical fiber connecting device 900 according to the present invention. Exemplary optical fiber connecting device 900 is structurally similar to optical fiber connecting device 800 shown in FIGS. 9A-9D except that optical fiber connecting device 900 utilizes a different boot structure for activating the clamping mechanism of the device and an interconnection means to facilitate assembling a plurality of optical fiber connecting device 900A-900C into an optical fiber connecting device assembly or module 1000 which will be described in detail with respect to FIG. 11.

Optical fiber connecting device 900 includes a main body or housing 905 having an upper housing portion 910 and a lower housing portion 930 that can be secured together by catch features disposed on the upper and lower housing portions. The upper and lower housing portion are configured to contain a mechanical element 960 and an actuation mechanism 950 that allows for the mechanical element to be opened and closed a plurality of times. The actuation mechanism is an inline switch that comprises an actuation sleeve and an actuation element that can be repeatedly moved by an actuation element to open and close mechanical element as described with respect to optical fiber connecting device 800 of FIGS. 9A-9D.

Lower housing portion 930 includes first and second cable jacket clamping regions 920, 925 integrally formed at the ends of the lower housing portion to clamp onto and provide strain relief to optical fiber cables being terminated in optical fiber connecting device 900. The first cable jacket clamping region 920 is configured to clamp the jacketed portion of the first optical fiber cable 50 (shown in cross section in FIG. 10C) containing the first optical fiber 50 and the second cable jacket clamping region 925 configured to clamp the jacketed portion of the second optical fiber cable containing the second optical fiber 50'. In an alternative embodiment, the first and second cable jacket clamping regions can each be configured to clamp the outer surface of a buffer tube (not shown) containing the first and second optical fibers, respectively.

In an exemplary embodiment, the first and second cable jacket clamping regions 920, 925 can have the same basic structures. For example, each of the first and second cable jacket clamping regions comprises a clamping portion having a collet-type, split body shape with two arms 921a, 921b that extend away from lower housing portion 930 along a common axis. The clamping portion can include raised inner surfaces (e.g. teeth, barbs or triangular ridges, not shown) near the free end of the arms to permit ready clamping of the cable jacket portion of an optical fiber cable. The clamping portion can be actuated by a push on boot assembly 980.

In this embodiment boot assembly 980 is made up of two portions: a collet tube 981 and a boot cap 986. The collet tube has a generally tubular shape with a raised securing ring and/or securing groove on one end, for example securing ring 981a and securing groove 981b shown in FIG. 10B.

At least one arm of the clamping portion of optical fiber connecting device 900 can include a raised protrusion 924 to capture the collet tube 981 when it is slipped over the arms 921a, 921b of the clamping portion of the optical fiber connecting device 900.

The boot cap 986 has an open first end 986a that fits over and engages with the securing ring 981a on one end of the collet tube 981 an a domed end 986b having an opening 986c therethrough to allow passage of optical fiber cable 50. The open first end of the boot cap can have plurality of slots 986d extending perpendicular to the first open end of the boot cap. The slots allow the first end of the boot cap to flex over the securing ring of the collet tube and then spring back to lock the boot cap in place.

To terminate the first and/or the second optical fibers in optical fiber connecting device 900, the actuation sled 956 is moved to a first position opening the mechanical element 960 as shown in FIG. 10C. Boot cap 986 and collet tube 981 is slipped over the end of the first optical fiber being terminated. 6 cm of the cable jacket is removed. Strength members can be retained and folded backwards and pushed through the collet tube to expose the buffer coated optical fiber. The 250 μm buffer is stripped off from about 24 mm from the end of the jacket to expose the glass portion of the optical fiber. The bare glass portion of the fiber can be cleaned with alcohol, if necessary. Next, the bare glass portion is cleaved to a length of 10 mm beyond buffer using industry standard precision cleaver tool.

The bare glass of the optical fiber is inserted into the device until a resistance force is felt through the fiber and/or a fiber bow can be seen. The actuation sled is pushed to a second position, lifting the actuation sleeve 951 to close the mechanical element around the bare glass portion of the fiber. The fiber bow can then be released.

The collet tube is then moved forward over the arms of the clamping portion until it slides past the raised protrusion 924 on at least one of the arms. The Kevlar is fanned out over the securing ring of the collet tube, and the boot cap is pushed over the securing ring of the collet tube locking the Kevlar to the optical fiber connecting device. Any excess Kevlar is then cut away.

Thus, the collet tube actuates each of the clamping portions of the exemplary connecting device and the boot cap secures the fiber optic cables Kevlar yarn strength members to the clamping portion to strain relieve the fiber optic cable when secured to the optical fiber connecting device 900. The exemplary boot assembly of the present embodiment can facilitate clamping onto the optical fiber cable jacket in very dense connection installations since pushing in the collet tube and the boot cap can require less finger space than a twist on boot. When the second optical fiber needs to be connected, the procedure is repeated.

Figure 11:
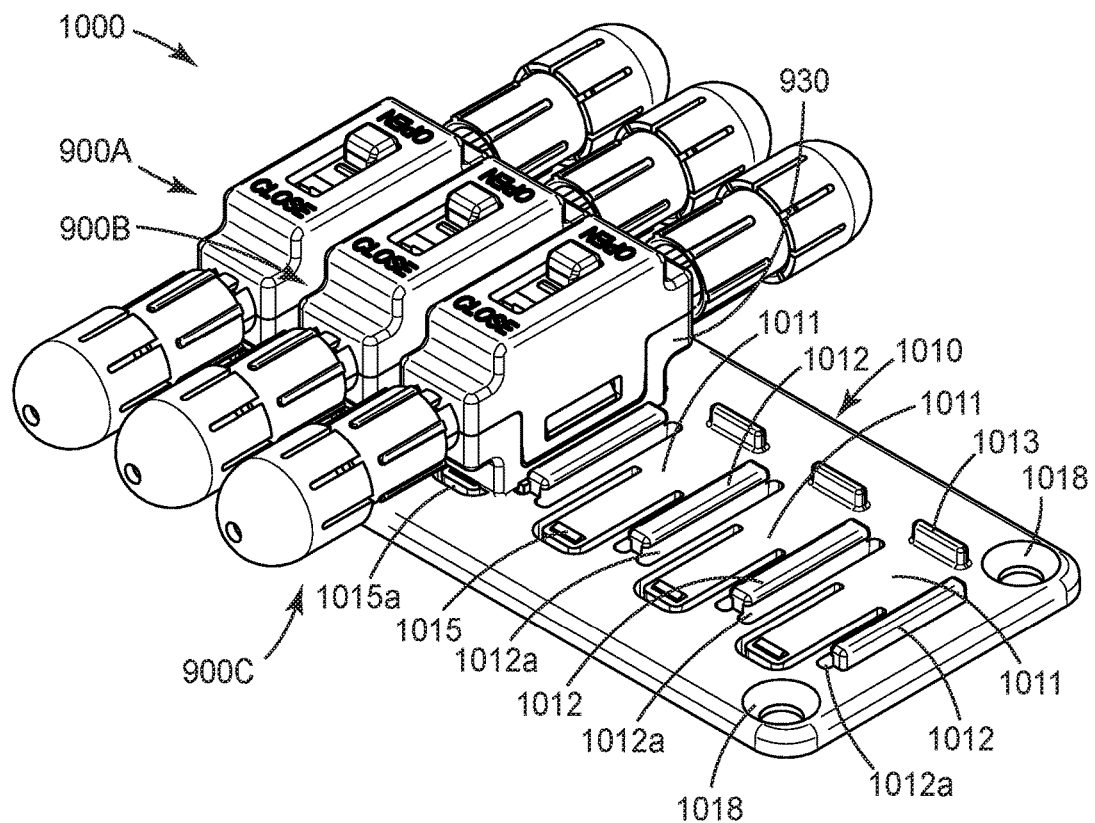
FIG. 11 is an isometric view of a partially assembled optical fiber connecting device module assembly according to the present invention.

As mentioned above, a plurality of optical fiber connecting devices 900A-900C can be assembled into an optical fiber connecting device assembly or module 1000 shown in FIG. 11. For example, each of the plurality of optical fiber connecting devices includes a lip 938 formed on each side of the lower housing portion. These lips are configured to connect the optical fiber connecting device to a module frame or base plate 1010.

Module base plate 1010 includes a plurality of bays 1011 defined by a pair of rails 1012. Each of the rails can include an overhang portion 1012a disposed above the floor of each base. The lips formed along the sides of the lower housing portion of each optical fiber connecting devices are slid beneath the overhang portions of the rails on either side of the bay. The optical fiber connecting device is pushed forward into the bay until it contacts stop 1013 on the far side of the bay.

In an exemplary aspect, the module base plate 1010 includes six bays. Optical fiber connecting devices 900A-900C occupy three of the bays, while the other three bays are empty. The module base plate can be configured with any number of bays as required for a particular application.

In the exemplary embodiment shown in FIG. 11, the module base plate includes a cantilevered latch 1015 in each bay 1011 to lock an optical fiber connecting device in the bay. Each cantilevered latch can have a barb 1015a disposed near its free end. The barb can engage with optical fiber connecting device such as with lower housing portion 930C of optical fiber connecting device 900C to lock the device in the bay. The optical fiber connecting device can be extracted from the module base plate by applying a sufficient extraction force such that the cantilevered latch is deflected and allows the device to be slid out of the bay of the module base plate.

The module base plate 1010 can include a plurality of openings 1018 at its corners to accommodate mechanical fasteners to enable installation of optical fiber connecting device module 1000 into a telecommunication closure, cabinet, terminal or other telecommunication installation. In an alternative aspect, the optical fiber connecting device module can be secured with a piece of transfer adhesive or piece of double sided tape.

FIG. 12A illustrates how a plurality of individual optical fiber connecting devices 100 (FIGS. 1A-1F) can be assembled in a module frame 1210 to form optical fiber connecting device module 1200. In the exemplary embodiment, module frame 1210 can be a one-piece elongated metal frame having a base 1211 and two sides 1212a, 1212b connected to the base along one edge. The module frame has a plurality of u-shaped notches 1213 along the top edge of the frame's side walls to hold the plurality of optical fiber connecting devices.

FIG. 12B shows an alternative optical fiber connecting device module 1300 that is a variation of optical fiber connecting device module 1200. Rather than having individual optical fiber connecting device connected to the frame, optical fiber connecting device module 1300 includes a module frame 1310 that is attached to a single ganged base housing portion 1330. The ganged base housing is configured to hold a plurality of mechanical elements 1360 parallel to one another and a plurality of actuation mechanisms 1350 that are capable of opening and closing the plurality of mechanical elements a number of times which allows the first and second optical fibers to be positioned, secured and within each of the plurality of mechanical elements at the same or different times. Each of the mechanical elements and actuation mechanism is held within the ganged base portion by an individual upper housing portion 1320 that can be secured to the ganged base housing portion via a snap fit, ultrasonic weld or an adhesive.

Figure 13:
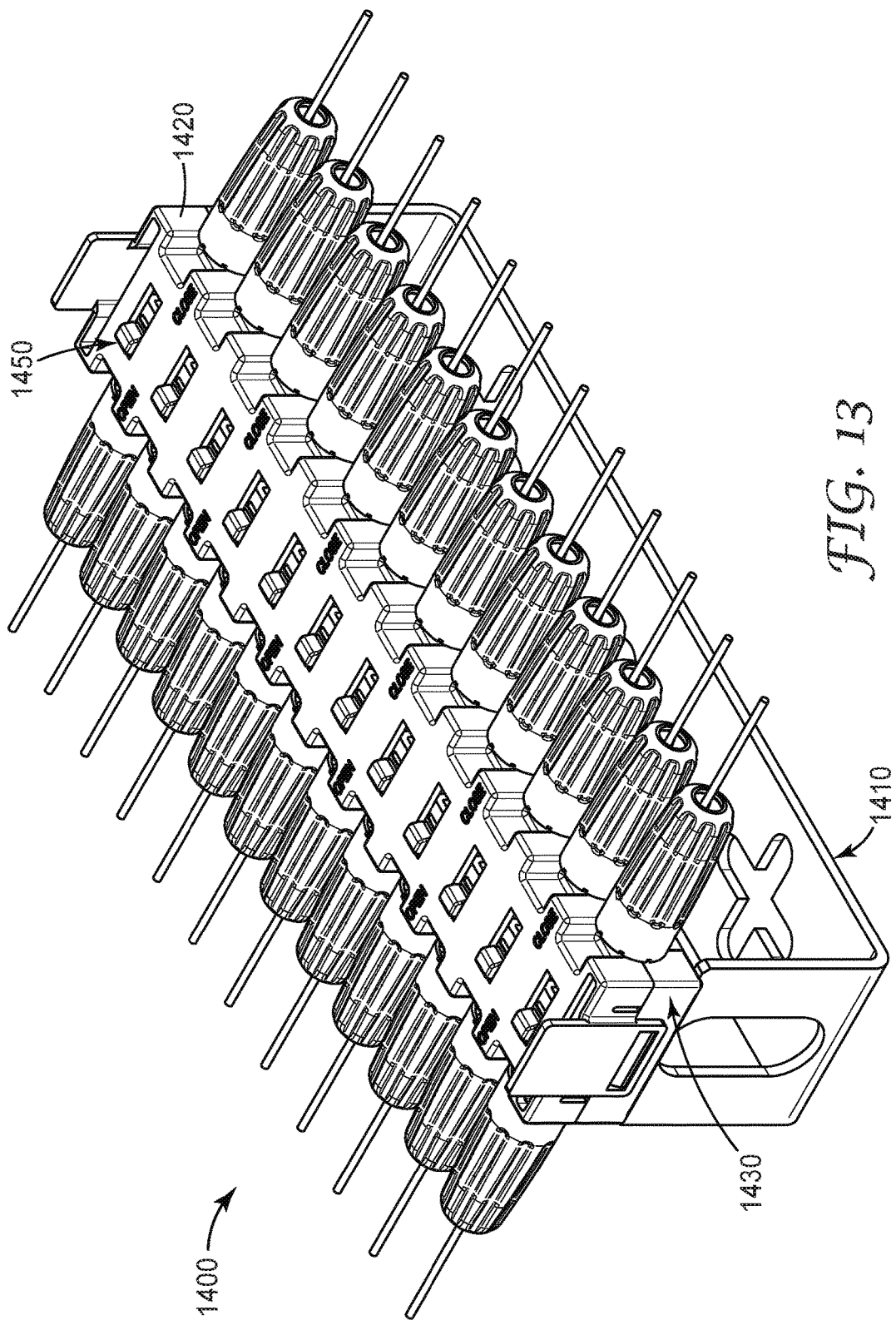
FIG. 13 is an isometric view of another exemplary assembled optical fiber connecting device module assembly according to the present invention.

FIG. 13 shows yet another alternative embodiment of an optical fiber connecting device module 1400. Optical fiber connecting device module 1400 has a single ganged base housing portion 1430 and a ganged upper housing portion 1420 attached to the ganged base housing portion. This optical fiber connecting device module has a plurality of mechanical elements (not shown) parallel to one another and a plurality of inline switch-style actuation mechanisms 1450 that have a form and function similar to actuation mechanism 850 described previously with respect to FIGS. 9A-9D. Actuation mechanisms 1450 are capable of opening and closing the plurality of mechanical elements a number of times which allows the first and second optical fibers to be positioned, secured and within each of the plurality of mechanical elements at the same or different times.

The exemplary optical fiber connecting devices described herein provide the reconnectability of an optical fiber connector system in a smaller form factor. In an exemplary aspect, the form factor of the devices described herein can be similar the form factor of an LC connector. There are fewer parts in the exemplary optical fiber connecting devices described herein than in conventional optical fiber connector systems which require two complete optical fiber connectors and a connector adapter to interconnect the optical fiber connectors. The exemplary optical fiber connecting devices do not have some of the more expensive parts (i.e. the ferrules) that are required in standard optical fiber connectors which can result in a lower manufacturing cost. Another advantage of the exemplary optical fiber connecting devices is that they do not require polishing or finishing that is required by some optical fiber connectors. The exemplary fiber connector devices can be used as a stand-alone connecting device or a plurality of the exemplary connecting devices can be assembled together to form a module or patch panel.

Making optical connections with the exemplary devises described herein can be made more quickly than other field installed connectors and with no special tools. This time savings may result in a lower installation cost to the network providers. If the installer makes a mistake, he can recover quickly without endangering the connector, meaning, the installation mistake would be in fiber preparation, the connector should be unharmed and can be reused after removing, re-cleaving and cleaning the end of the optical fiber.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

We claim:

1. An optical fiber connecting device for connecting first and second optical fibers, each optical fiber including a bare glass portion surrounded by a buffer layer, the device comprising:
   a housing comprising an upper housing portion and a lower housing portion;
   a mechanical element disposed in a cavity of the lower housing portion, the mechanical element configured to axially align and connect the bare glass portions of the first and second optical fibers;
   an actuation sleeve receiving at least a portion of the mechanical element, and configured to move within the housing between a first position and a second position; and
   an actuation mechanism configured to cause the actuation sleeve to move within the housing between the first position and the second position to cause the mechanical element to open and close, respectively, thereby allowing the first and second optical fibers to be positioned, secured, and actuated in the mechanical element at the same or different times, wherein the mechanical element is configured to open and close a plurality of times, wherein the actuation mechanism comprises a first actuation element that extends from a first wall of the actuation sleeve and a second actuation element that extends from a second wall of the actuation sleeve, wherein interaction with the first actuation element causes the actuation sleeve to move to the first position, and wherein interaction with the second actuation element causes the actuation sleeve to move to the second position.

2. The device of claim 1, wherein the first optical fiber is a portion of a first optical fiber cable and the second optical fiber is a portion of a second optical fiber cable, the first and second optical fiber cables each comprising a jacket that surrounds the buffer layer of each optical fiber.

3. The device of claim 2, wherein the lower housing portion further includes first and second cable jacket clamping regions formed at ends of the lower housing portion and disposed on either side of the mechanical element, the first cable jacket clamping region being configured to clamp the jacket of the first optical fiber cable containing the first optical fiber, and the second cable jacket clamping region being configured to clamp the jacket of the second optical fiber cable containing the second optical fiber.

4. The device of claim 3, wherein the first and second cable jacket clamping regions each comprise a clamping portion formed at an end thereof, wherein each clamping portion comprises a collet-type, split body shape.

5. The device of claim 3, wherein the first and second cable jacket clamping regions each include stops formed on an inner surface thereof to prevent passage of a jacketed fiber.

6. The device of claim 3, further comprising a first boot attachable to the first cable jacket clamping region and a second boot attachable to the second cable jacket clamping region of the lower housing portion.

7. The device of claim 6, wherein the first and second boots are configured to clamp the first and second cable jacket clamping regions onto respective jacketed portions via axial movement relative to the lower housing portion.

8. The device of claim 7, wherein each boot attaches to the respective cable jacket clamping region via a screw-type mechanism.

9. The device of claim 1, wherein the actuation mechanism can be actuated by a user without a separate tool.

10. The device of claim 1, wherein the mechanical element comprises an index matching gel positioned between the point where the bare glass portions of the first and second optical fibers will ultimately reside upon actuation.

11. The device of claim 1, wherein the actuation mechanism comprises a switch that moves the actuation sleeve relative to the mechanical element that is held in a fixed position in the housing.

12. The device of claim 11, wherein the switch swivels from an open position to a closed position.

13. The device of claim 11 wherein the switch slides from a first closed position to a second open position.

14. The device of claim 1, wherein the mechanical element comprises an aluminum mechanical element.

15. An optical fiber connecting device module for interconnecting bare glass portions of a plurality of optical fibers, comprising:
   a module housing comprising at least one upper housing portion and at least one lower housing portion;
   a plurality of mechanical elements disposed at least partially within the module housing and arranged parallel to one another in a side-by-side arrangement;
   a plurality of actuation sleeves, wherein each actuation sleeve receives at least a portion of a corresponding mechanical element of the plurality of mechanical elements, and each actuation sleeve is configured to move within the module housing between a first position and a second position; and
   an plurality of actuation mechanisms disposed at least partially within the module housing, wherein each actuation mechanism is configured to cause a corresponding actuation sleeve of the plurality of actuation sleeves to move within the module housing between the first position and the second position to cause a corresponding mechanical element to open and close, respectively, thereby allowing first and second optical fibers to be positioned, secured, and actuated in the mechanical element at the same or different times, and wherein each actuation mechanism comprises a first actuation element that extends from a first wall of the actuation sleeve and a second actuation element that extends from a second wall of the actuation sleeve, wherein interaction with the first actuation element causes the actuation sleeve to move to the first position, and wherein interaction with the second actuation element causes the actuation sleeve to move to the second position.

16. The module of claim 15, further comprising a module frame attached to the module housing, wherein the module frame is configured to anchor the module in a telecommunication installation.

17. The module of claim 15, wherein the at least one lower housing portion is a ganged housing portion that is configured to hold the plurality of mechanical elements in a side-by-side configuration.

18. The module of claim 15, comprising a plurality of optical fiber connecting device housings each holding a different mechanical element of the plurality of mechanical elements and a different actuation mechanism of the plurality of actuation mechanisms, wherein the optical fiber connecting device housings are connected to a module frame in a parallel arrangement to form an assembly.

19. A method of connecting two optical fibers, comprising:
- providing a first optical fiber having a bare glass portion surrounded by a buffer layer;
- providing a second optical fiber having a bare glass portion surrounded by a buffer layer;
- sliding the bare glass portion of the first optical fiber into a first end of a mechanical element until the first optical fiber experiences a certain resistance;
- activating an actuation mechanism to cause an actuation sleeve within a housing to move from a first position to a second position to cause a mechanical element received within at least a portion of the actuation sleeve to lock the first optical fiber into the mechanical element, wherein the actuation mechanism comprises a first actuation element that extends from a first wall of the actuation sleeve and a second actuation element that extends from a second wall of the actuation sleeve;
- sliding the bare glass portion of the second optical fiber into a second end of the mechanical element opposite the first end until the second optical fiber experiences a certain resistance; and
- activating the actuation mechanism to cause the actuation sleeve within the housing to move from the first position to the second position to cause the mechanical element to lock the second optical fiber into the mechanical element.

* * * * *

UNITED STATES PATENT AND TRADEMARK OFFICE
CERTIFICATE OF CORRECTION

PATENT NO.        : 10,488,597 B2
APPLICATION NO.   : 15/762247
DATED             : November 26, 2019
INVENTOR(S)       : Rutesh D. Parikh et al.

It is certified that error appears in the above-identified patent and that said Letters Patent is hereby corrected as shown below:

In the Claims

In Column 22, Line 16, Claim 13, delete "11" and insert -- 11, --, therefor.

Signed and Sealed this
Twenty-fifth Day of February, 2020

Andrei Iancu
*Director of the United States Patent and Trademark Office*